US009756566B2

(12) United States Patent
Chapman et al.

(10) Patent No.: US 9,756,566 B2
(45) Date of Patent: *Sep. 5, 2017

(54) USER EQUIPMENT AND METHOD IN A COMMUNICATIONS NETWORK

(71) Applicant: Telefonaktiebolaget LM Ericsson (Publ), Stockholm (SE)

(72) Inventors: Thomas Chapman, Solna (SE); Muhammad Kazmi, Bromma (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/204,572

(22) Filed: Jul. 7, 2016

(65) Prior Publication Data
US 2016/0323822 A1    Nov. 3, 2016

Related U.S. Application Data

(63) Continuation of application No. 14/387,478, filed as application No. PCT/SE2014/050919 on Aug. 7, 2014, now Pat. No. 9,420,486.
(Continued)

(51) Int. Cl.
*H04B 7/00* (2006.01)
*H04W 52/02* (2009.01)
(Continued)

(52) U.S. Cl.
CPC ....... *H04W 52/0216* (2013.01); *H04W 24/08* (2013.01); *H04W 24/10* (2013.01);
(Continued)

(58) Field of Classification Search
CPC ..... H04W 36/04; H04W 36/08; H04W 36/14; H04W 36/18; H04W 36/36; H04W 36/38; H04W 48/16; H04W 48/20
(Continued)

(56) References Cited

U.S. PATENT DOCUMENTS

2009/0181676 A1* 7/2009 Lee .................. H04J 11/0093
 455/436
2010/0048209 A1 2/2010 Aoyama et al.
(Continued)

FOREIGN PATENT DOCUMENTS

WO  2005048529 A1  5/2005
WO  2013106473 A1  7/2013

OTHER PUBLICATIONS

3GPP_TSG_WG2_Meeting_82, Fukuoka, Japan, R2-132143 held May 20-24, 2013 Change Request 25.304 CR 0358 Current Version: 11.2.0, Title: Introduction of CSG CELL_FACH Mobility, Source to WG: Alcatel-Lucent, Source to TSG: R2, Work Item Code: EHNB_enh3-Core, Category B dated May 10, 2013 consisting of 3-pages.
(Continued)

*Primary Examiner* — Simon Nguyen
(74) *Attorney, Agent, or Firm* — Christopher & Weisberg, P.A.

(57) ABSTRACT

A method in a User Equipment (UE) of performing measurements of a plurality of measurement types is provided. The UE performs a measurement of a first measurement type and at least one of a measurement of a second and a third measurement type. In the performed measurements:

the at least one of a measurement of the second and the third measurement type is performed during a required time such that first pre-defined requirements for the at least one of a measurement of the second and third measurement type are met, the required time forming part of a time available for measurements, and the measurement of the first measurement type is performed during a remaining time, during which the at
(Continued)

least one of a measurement of the second measurement type and a measurement of the third measurement type is not performed.

30 Claims, 14 Drawing Sheets

Related U.S. Application Data

(60) Provisional application No. 61/862,985, filed on Aug. 7, 2013.

(51) Int. Cl.

| | | |
|---|---|---|
| *H04W 24/08* | (2009.01) | |
| *H04W 24/10* | (2009.01) | |
| *H04W 36/00* | (2009.01) | |
| *H04W 72/04* | (2009.01) | |
| *H04W 72/08* | (2009.01) | |
| *H04W 72/10* | (2009.01) | |
| *H04W 36/30* | (2009.01) | |

(52) U.S. Cl.
CPC ... *H04W 36/0088* (2013.01); *H04W 72/0446* (2013.01); *H04W 72/085* (2013.01); *H04W 72/10* (2013.01); *H04W 36/30* (2013.01); *Y02B 60/50* (2013.01)

(58) Field of Classification Search
USPC .......................................... 455/512, 525, 517
See application file for complete search history.

(56) References Cited

U.S. PATENT DOCUMENTS

| | | | | |
|---|---|---|---|---|
| 2010/0202307 A1* | 8/2010 | Lee | ................... | H04W 36/0088 370/252 |
| 2010/0240368 A1* | 9/2010 | Fox | ...................... | H04W 36/04 455/435.3 |
| 2011/0170481 A1* | 7/2011 | Gomes | .............. | H04W 36/0083 370/328 |
| 2012/0044910 A1* | 2/2012 | Maeda | .................. | H04L 5/0005 370/332 |
| 2012/0252455 A1* | 10/2012 | Martin | .............. | H04W 36/0094 455/436 |
| 2013/0188503 A1* | 7/2013 | Anepu | .................. | H04W 24/10 370/252 |
| 2014/0341059 A1* | 11/2014 | Jang | ...................... | H04W 48/06 370/252 |
| 2015/0117283 A1* | 4/2015 | Wei | ................... | H04W 36/0088 370/311 |

OTHER PUBLICATIONS

3GPP TS 25.304 V11.3.0 (Jun. 2013) 3rd Generation Partnership Project; Technical Specification Group Radio Access Network; User Equipment (UE) procedures in idle mode and procedures for cell reselection in connected mode (Release 11) Jul. 3, 2013 consisting of 53-pages.
3GPP TS 25.133 V11.5.0 (Jul. 2013) 3rd Generation Partnership Project; Technical Specification Group Radio Access Network; Requirements for support of radio resource management (FDD) (Release 11) Jul. 7, 2013 consisting of 289-pages.
3GPP_TSG_WG4_Meeting_68, Barcelona, Spain R4-134070 held Aug. 19-23, 2013, Agenda Item: 6.3, Source: Ericsson, ST-Ericsson, Title: Cross Transceiver Coupling in AAS Systems, Document for Discussion consisting of 3-pages.
PCT International_Search Report and Written Opinion dated Nov. 24, 2014 for International Application No. PCT/SE2014/050919, International Filing Date—Aug. 7, 2014 consisting of 13-pages.
PCT Written Opinion of the International Preliminary Examining Authority (IPEA) dated Jul. 2, 2015 for International Application No. PCT/SE2014/050919, International Filing Date—Aug. 7, 2014 consisting of 10-pages.
PCT Notification Concerning Transmittal of International Preliminary Report on Patentability dated Nov. 10, 2015 for corresponding International Application No. PCT/SE2014/050919; International Filing Date: Aug. 7, 2014, consisting of 20-pages.

* cited by examiner

Figure 1 UE RRC states

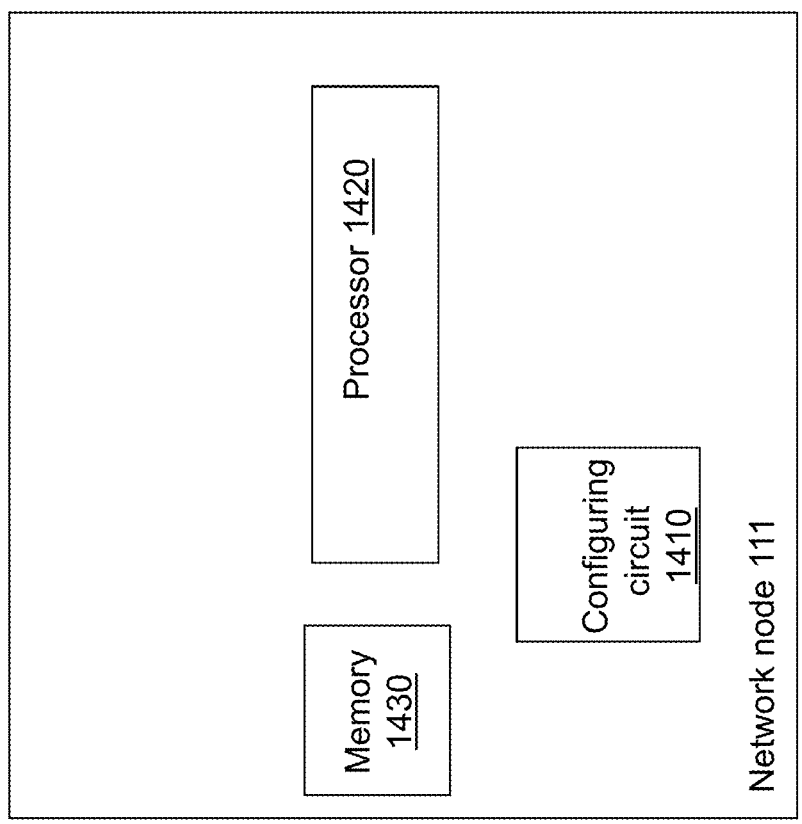

USER EQUIPMENT AND METHOD IN A COMMUNICATIONS NETWORK

CROSS-REFERENCE TO RELATED APPLICATIONS

This application is a continuation of U.S. patent application Ser. No: 14/387,478, filed Sep. 23, 2014, which is a U.S. National Stage Application of, and claims priority to, Patent Cooperation Treaty Application No. PCT/SE2014/050919, filed Aug. 7, 2014, and also claims priority to U.S. Provisional Patent Application No. 61/862,985, filed Aug. 7, 2013, the entirety of all of which are incorporated herein by reference.

FIELD

Embodiments herein relate to a user equipment, a network node and methods therein. In particular it relates to performing measurements of a plurality of measurement types and configuring the user equipment for performing measurements of the plurality of measurement types.

BACKGROUND

Communication devices such as terminals are also known as e.g. User Equipments (UE), mobile terminals, wireless terminals and/or mobile stations. Terminals are enabled to communicate wirelessly in a cellular communications network or wireless communications system, sometimes also referred to as cellular radio systems or cellular networks. The communication may be performed e.g. between two terminals, between a terminal and a regular telephone and/or between a terminal and a server via a Radio Access Network (RAN) and possibly one or more core networks, comprised within or connected to the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area is being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also on the cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station or terminal. The expression Uplink (UL) is used for the transmission path in the opposite direction i.e. from the mobile station or terminal to the base station.

The Universal Mobile Telecommunications System (UMTS) is a third generation mobile cellular system for networks based on the GSM standard. UMTS is developed and maintained by the 3rd Generation Partnership Project (3GPP). UMTS uses wideband code division multiple access (WCDMA) radio access technology to offer greater spectral efficiency and bandwidth to mobile network operators.

In 3GPP Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

UMTS specifications allow for a UE to be configured into one of a number of so called Radio Resource Control (RRC) states. These RRC states comprise an Idle Mode state, denoted Idle state or Idle Mode, in which the UE has no active RRC connection with the network, and 4 connected mode states: URA_PCH, CELL_PCH, CELL_FACH and CELL_DCH. See 3GPP TS 25.304 v11.3.0, User Equipment (UE) procedures in idle mode and procedures for cell reselection in connected mode.

FIG. 1 depicts the UE RRC states. The states in the RRC connected mode, are Cell Dedicated Channel (CELL_DCH), Cell Forward Access Channel (CELL_FACH), Cell Paging Channel (CELL_PCH) and Universal Terrestrial Radio Access Network (UTRAN) Registration Area Paging Channel (URA_PCH).

CELL_DCH is different from all of the other states in that in CELL_DCH, mobility is actively managed by a Radio Network Controller (RNC) by means of handover and serving cell change procedures. In idle mode, CELL_PCH, URA_PCH and CELL_FACH states, the UE performs cell reselection based on measurements and general parameters that are configured by the network.

In order to perform cell reselection when necessary, a UE measures the received signal quality from its own cell, from neighbor cells and from cells on other Radio Access Technologies (RATs) or carriers. In this context, "carriers" refers in general to other UMTS cells operating on different frequencies. The means by which the measurements are made depend on the type of UE and the configuration of the UE.

Measurements will typically be filtered using both Layer 1 (L1) and Layer 3 (L3) filtering. L1 filtering is a basic filtering of raw measurements performed in a physical layer of the UE. L3 filtering is a combining of several L1 filtered measurements. The L3 filtering coefficients and manner of the L3 filtering may be specified in the 3GPP specifications. The L3 filtering coefficients are configured at the UE by the network using RRC signaling. A measurement threshold is configured by the network by means of UE specific or cell specific signaling. The threshold may apply to received signal strength or received signal quality, such as e.g. signal to interference and noise ratio. In UMTS Frequency Division Duplex (FDD) the examples of signal strength and received signal quality measurements used by the UE in all RRC states, including idle mode, are Common Pilot Channel (CPICH) Received Signal Code Power (RSCP) and CPICH Energy per chip/Noise spectral density (Ec/No) respectively. An alternative to CPICH Ec/No is the received energy per chip divided by the power density in the band. See 3GPP TS 25.133 v11.5.0, "Requirements for support of radio resource management (FDD)".

The UE procedures like identifying a new cell, acquiring or reading of System Information (SI) of a cell, such as e.g. cell information sent on Master Information Block (MIB) and System Information Blocks (SIBs, are also considered to be UE measurements. All these UMTS measurements are also interchangeably called mobility measurements or more generally Radio Resource Management (RRM) measurements. The cell to be identified or whose SI is read may belong to an intra-frequency carrier, an inter-frequency carrier or to an inter-RAT carrier e.g. an E-UTRA carrier. If a threshold is exceeded by a filtered measurement from a neighbor cell and/or a received signal strength or quality of a measured cell exceeds that of the cell on which the UE is camped, then the UE will change from camping on the old cell to camping on the new cell on which it has performed measurements.

Measurements may be categorized into 2 types. A first type comprises Intra frequency measurements, which are measurements that are performed on neighbor cells that use the same carrier as the cell on which the UE is currently camped. A second type comprises "Inter-frequency" and "Inter-RAT" measurements, which are performed on different carriers compared to the carrier of the cell on which the UE is currently camped. In inter-RAT measurements the carrier measured upon belongs to a RAT, which is different than that of the serving UMTS.

In idle mode, intra-frequency measurements may in principle be performed at any time by the UE. However the UE will be configured by means of cell or UE specific signaling with a so-called Discontinuous Reception (DRX) cycle in idle mode. The DRX cycle requires that during certain periods of time, the UE should have it's receiver switched ON in order to be able to receive signaling messages from the cell on which it is camped. During the intervening time, the UE may switch off it's receiver in order to reduce power consumption. Typically, measurements made for reselection evaluation on the same carrier are performed during the times at which the UE receiver has to be switched on according to the DRX cycle.

FIG. 2 illustrates allocation of time for gathering L1 and L3 filter samples for intra-frequency measurements. L1 samples are spot measurements made in the UE baseband and provided to the L3 filter. L3 samples are obtained by filtering the measurements reported by L1 after L1 filtering.

Inter-frequency measurements in idle mode may be performed at any time if the UE possesses at least 2 receiver chains, one of which can receive on the carrier of the camped cell and the other of which can be used for making inter-carrier or inter-RAT measurements. If the UE possesses only one receiver chain, then inter-frequency and inter-RAT measurements are performed by means of re-tuning the receiver to carriers on which measurements are to be made during periods of the DRX cycle in which the UE is not required to receive from the camped cell.

FIG. 3 shows Allocation of time for gathering L1 and L3 filter samples for inter-frequency measurements.

If the UE is configured in CELL_PCH or URA_PCH, the procedures for making measurements and performing cell reselection are similar to idle mode.

If the UE is configured in CELL_FACH, two possibilities exist for configuration of the UE to perform measurements for cell reselection. The first is that so-called "measurement occasions" are configured. If this is the case, then during such "measurement occasions", the UE does not need to receive from it's camped cell and can therefore re-tune it's receiver to make inter-frequency or inter-RAT measurements. The second possibility is that DRX cycles are configured. In this case, the UE can make inter-frequency measurements at times at which it's receiver is not required to be tuned to the camped cell, in a similar manner to that of idle mode.

In order to guarantee good mobility performance, the 3GPP specifications place requirements on the maximum amount of time the UE should take to make all necessary measurements, including getting sufficient measurement samples for L1 and L3 filtering, in order to be able to make a decision that cell reselection is required.

In idle mode, the requirements are relatively loose and allow the UE a significant amount of freedom in scheduling it's inter- and intra-frequency measurements whilst still making it's decision within the required time.

In CELL_FACH mode, the requirements on the measurement time are more stringently specified due to the enhanced degree of connectivity. The CELL_FACH requirements are derived by setting first the total amount of receiver time that is required for getting sufficient measurement values for making a reselection decision. The requirement on the time during which measurements shall be performed then depends on the UE configuration. These requirements are pre-defined in 3GPP specifications and their compliance by the UE is ensured by means of conformance testing procedures. Examples of such pre-defined requirements, also denoted measurement requirements, performance requirements, RRM requirements etc., related to measurements used in CELL_FACH are cell identification delay, e.g. 10 seconds, physical layer measurement period or measurement time, e.g. 2 seconds, measurement reporting delay, measurement reporting time, measurement accuracy, number of identified cells required to be measured by the UE (e.g. 8 cells), applicable signal quality target for measuring a cell, e.g. CPICH Ec/No$\geq$$-17$ dB; Synchronization CHannel (SCH) Ec/No$\geq$$-17$; SCH Es/Iot$\geq$$-4$ dB; Cell-specific Reference Signal (CRS) Es/Iot$\geq$$-4$ dB etc. The CRS Es/Iot is similar to CRS SINR. More specifically parameter Es and Iot according to TS 36.133 are described as:

$\hat{E}s$ Received energy per RE (power normalized to the subcarrier spacing) during the useful part of the symbol, i.e. excluding the cyclic prefix, at the UE antenna connector.

Iot The received power spectral density of the total noise and interference for a certain RE (power integrated over the RE and normalized to the subcarrier spacing) as measured at the UE antenna connector.

When measurement occasions are configured, the requirement on measurement time for inter-frequency and inter-RAT measurements is derived by allocating the time during which it is necessary for the receiver to be tuned to other carriers to measurement occasion periods such that enough measurement occasion periods are available for performing all of the measurements.

FIG. 4 shows derivation of the requirement for intra-frequency measurements in CELL_FACH.

When DRX is configured, the requirement for intra-frequency measurements is made by allocating the total time required for performing all measurements into the periods during which the receiver has to be ON and receiving from the camped cell.

The handling of inter-frequency and inter-RAT measurements when DRX in CELL_FACH is configured depends on the relative lengths of time of the receiver ON period and the period of time during which the receiver does not need to be tuned to the camped cell. The UE requires sufficient amount of measurement samples during the measurement time in order to meet the pre-defined measurement requirements, e.g. accuracy of the measurement, i.e. how accurate the measurement is. In a DRX cycle, the OFF time is the time during which the UE is not scheduled any data. However the UE may still use this time for doing measurements on radio signals, e.g. CPICH measurements. If the "Off" time is shorter than the "On" time, the time required for acquiring sufficient measurement samples for inter-frequency/RAT measurements over the measurement time is allocated to the "Off" times, i.e. OFF periods, when the receiver may be tuned to another carrier, and the requirement for reselection is derived by allowing a sufficient amount of time to collect all necessary samples on all carriers.

FIG. 5 depicts derivation of the requirement for inter-frequency measurements in CELL_FACH.

If the "Off" time is longer than the "On" time, then the time required for acquiring sufficient measurement samples is allocated to the "Off" times by assuming that the receiver is used for making inter-frequency/RAT measurements during "Off" times for a period of time as long as the "ON" time and allocating a sufficient number of "Off" time periods to allow the total required amount of measurement samples on all carriers to be collected or obtained between the "ON" time periods during the "Off" times. The requirement for reselection is derived as an amount of time required to cover the sufficient number of "Off" time periods.

FIG. 6 illustrates derivation of the requirement for inter-frequency measurements in CELL_FACH for a situation when the "Off" time is longer than the "On" time.

Typically, the UE is configured with a list of UMTS carriers and carriers of other RATs on which it should make measurements. In UMTS the other RATs or more commonly called inter-RATs can be any one or more of Evolved Universal Terrestrial Radio Access (E-UTRA) FDD, E-UTRA time division duplex (TDD), Global System for Mobile Communications (GSM)/GSM/EDGE Radio Access Network (GERAN)/Enhanced Data Rates for GSM Evolution (EDGE), Code Division Multiple Access (CDMA) 2000, High Rate Packet Data (HRPD) and even Wireless Local Area Network (WLAN). The examples of inter-RAT UE measurements used for cell reselection are Reference Signal Received Power (RSRP) and Reference Signal Received Quality (RSRQ) in E-UTRA and GSM carrier Received Signal Strength Indication (RSSI) in GSM/GERAN/EDGE. An identification of an inter-RAT cell and acquisition of its system information, e.g. cell information sent on MIB and SIBs, are also kinds of inter-RAT measurements. All these inter-RAT measurements are also interchangeably called inter-RAT mobility measurements or more generally inter-RAT RRM measurements. However different carriers may be deployed by operators for different reasons. For example, a carrier might be provided with large cells for coverage reasons. Alternatively, a carrier might be provided for hotspots to add capacity.

For carriers necessary for coverage, it is only necessary for the UE to make measurements when the quality of its current cell is becoming poor. If the current cell is received with good quality, then it is not necessary for the UE to monitor carriers that are provided for coverage only and it can save UE battery life by not making measurements.

Hotspot provision, on the other hand is unpredictable from a UE point of view and hence it is necessary for a UE to continuously make measurements to evaluate if it should reselect to cells on a hotspot carrier.

Thus, the set of carriers and RATs on which the UE needs to make measurements differs depending on the quality of the current camped cell:

If the current cell is received with quality above a configurable threshold, then the UE makes measurements only on so-called "high priority" carriers and RATs, typically carriers provided for capacity. Measurements may only be made once per minute.

If the current cell is received with quality lower than a configurable threshold, then the UE makes measurements for evaluation of reselection on all carriers and RATs indicated to it. Measurements may be made continuously.

For example, in all cases with CELL_FACH measurements, if inter-frequency or inter-RAT measurements are configured and made and then further inter-frequency or inter-RAT measurements are added to the configuration, then the measurement requirements for all of the existing and newly configured measurements are re-scaled to meet the existing time, which is already pre-defined in the standard, i.e. the time used by measurements without rescaling the measurements.

In idle mode, it is possible for a UE to autonomously reselect to a closed subscriber group (CSG) cell. The CSG cell may be accessed by selected set of the UEs also known as members of CSG. Typically a CSG cell is served by a customer premises node like home base station. Its access to the UE is therefore determined by the server provider or owner/subscriber of the CSG cell. The means by which the UE can detect the presence of a CSG cell, make measurements and reselect are left for UE implementation. However the UE is allowed to reselect a target CSG cell if this cell's CSG ID is included in the UE's CSG white list. Typically, the UE will need some sort of proximity detection. If the UE detects that it is in proximity to a CSG cell, then if the cell is on a different carrier as compared to those configured for reselection measurements the UE will need to make additional inter-frequency or inter-RAT measurements on the carrier of the CSG cell. It will need to schedule it's measurements such that it still meets the requirements for making reselection evaluation measurements. Since in idle mode the requirements on time durations for reselection measurements are relatively relaxed, it is straightforward for the UE to schedule the additional measurements on the CSG carrier.

In 3GPP Release 11, the specifications will allow for the UE to perform autonomous reselection measurements also in CELL_FACH.

In UMTS the network node, e.g. RNC may assign each UMTS carrier frequency and inter-RAT carrier frequency for a UE in a low activity RRC state, such as idle mode, CELL_PCH, URA_PCH and CELL_FACH, with a priority level ranging from 0 to 7. Thus a UMTS inter-frequency or inter-RAT carrier may be of low, equal or of higher priority with respect to the priority of the serving cell's carrier frequency. The inter-frequency/inter-RAT measurement rules, the cell reselection procedures and the corresponding measurement requirements in low activity RRC states thus also depend upon the priority levels assigned to the UMTS carrier and inter-RAT carrier frequencies.

As mentioned above, 3GPP has agreed to enable autonomous reselection to CSG in CELL_FACH. Further, as described above, the requirements on reselection evaluation in CELL_FACH may use all of the available measurement time in cases in which the length of the receiver (RX) OFF time in the DRX cycle is equal to or shorter than the RX ON time. If this is the case, then for some DRX configurations, it is not possible for the UE to schedule measurements on a CSG carrier for an autonomous reselection to CSG without compromising the existing measurement requirement, since the existing requirement requires the UE to use all of the available RX OFF time for performing such measurements. In other words for some DRX configurations the UE may not be able to meet the existing measurement requirements if it does not use the entire OFF time for doing measurements for reselection evaluation in CELL_FACH.

As mentioned before, the requirements on measurement time in CELL_FACH mode are more stringently specified than the requirements in Idle mode, due to the enhanced degree of connectivity. Furthermore, the OFF time periods of DRX mode, which may be used by a User equipment to perform measurements that require the User Equipment to tune its receiver to other frequencies, may be configured in different ways and may, depending on the length of the OFF time periods and the measurements to be performed, be a limited resource for fulfilling various requirements on measurement time.

SUMMARY

Thus there is a need for improved possibilities for UEs to perform measurements during OFF time periods of DRX or during configured measurement occasions such that necessary measurement requirements are fulfilled while allowing autonomous reselection to CSG in CELL_FACH.

It is therefore an object of embodiments herein to provide improved measurement possibilities in a wireless communications network.

This is achieved by intelligently sharing time between different measurement procedures including autonomous CSG search or reselection to the CSG cell. The UE is also able perform the existing cell reselection procedures in parallel with the autonomous CSG search or reselection to the CSG cell while meeting the existing requirements, e.g. measurement time of the existing cell reselection procedures.

According to a first aspect of embodiments herein, the object is achieved by a method performed by a User Equipment, UE, for performing measurements of a plurality of measurement types. The UE is served by a network node on a serving carrier frequency. The UE performs a measurement of a first measurement type and at least one of a measurement of a second measurement type and a measurement of a third measurement type. The measurement of the first measurement type is performed on at least one Closed Subscriber Group, CSG, cell, the measurement of the second measurement type is performed on at least one carrier frequency of low or equal priority compared to that of the serving carrier frequency, and the measurement of the third measurement type is performed on at least one carrier frequency of higher priority compared to that of the serving carrier frequency.

In the performed measurements:

(a) the at least one of a measurement of the second measurement type and a measurement of the third measurement type is performed during a required time such that first pre-defined requirements for the at least one of a measurement of the second measurement type and a measurement of the third measurement type are met, the required time forming part of a time available for measurements, and (b) the measurement of the first measurement type is performed during a remaining time, during which the at least one of a measurement of the second measurement type and a measurement of the third measurement type is not performed.

The required time and the remaining time form different parts of the time available for measurements.

According to a second aspect of embodiments herein, the object is achieved by a method performed by a network node, for configuring a User Equipment, UE, to perform measurements of a plurality of measurement types. The UE is configured to be served by the network node on a serving carrier frequency. The measurements of the plurality of measurement types comprise a measurement of a first measurement type and at least one of a measurement of a second measurement type and a measurement of a third measurement type. The measurement of the first measurement type is performed on at least one Closed Subscriber Group, CSG, cell, the measurement of the second measurement type is performed on at least one carrier frequency of low or equal priority compared to that of the serving carrier frequency, and the measurement of the third measurement type is performed on at least one carrier frequency of higher priority compared to that of the serving carrier frequency. The at least one of a measurement of the second measurement type and a measurement of the third measurement type is to be performed by the UE during a required time such that first pre-defined requirements for the at least one of a measurement of the second measurement type and a measurement of the third measurement type are met. The required time forms part of a time available for measurements.

The network node configures the UE with a maximum time available for the measurement of the first measurement type. The maximum time available for the measurement of the first measurement type is determined by scaling of a remaining time during which the UE is configured not to perform the at least one of a measurement of the second measurement type and a measurement of the third measurement type. The required time and the remaining time form different parts of the time available for measurements.

According to a third aspect of embodiments herein, the object is achieved by a User Equipment, UE, for performing measurements of a plurality of measurement types. The UE is configured to be served by a network node on a serving carrier frequency. The UE is configured to perform a measurement of a first measurement type and at least one of a measurement of a second measurement type and a measurement of a third measurement type. The UE is configured to perform the measurement of the first measurement type on at least one Closed Subscriber Group, CSG, cell, the measurement of the second measurement type on at least one carrier frequency of low or equal priority compared to that of the serving carrier frequency, and the measurement of the third measurement type on at least one carrier frequency of higher priority compared to that of the serving carrier frequency. In the performed measurements:

(a) the UE is configured to perform the at least one of a measurement of the second measurement type and a measurement of the third measurement type during a required time such that first pre-defined requirements for the at least one of a measurement of the second measurement type and a measurement of the third measurement type are met, the required time forming part of a time available for measurements, and (b) the UE is configured to perform the measurement of the first measurement type during a remaining time, during which the at least one of a measurement of the second measurement type and a measurement of the third measurement type is not performed, wherein the required time and the remaining time form different parts of the time available for measurements.

According to a fourth aspect of embodiments herein, the object is achieved by a network node for configuring a User Equipment, UE, to perform measurements of a plurality of measurement types. The UE is configured to be served by the network node on a serving carrier frequency. The measurements of the plurality of measurement types comprise a measurement of a first measurement type, and at least one of a measurement of a second measurement type and a measurement of a third measurement type. The measurement of the first measurement type is to be performed on at least one Closed Subscriber Group, CSG, cell, the measurement of the second measurement type is to be performed on at least one carrier frequency of low or equal priority compared to that of the serving carrier frequency, and the measurement of the third measurement type is to be performed on at least one carrier frequency of higher priority compared to that of the serving carrier frequency. The network node is configured to configure the UE with a maximum time available for the measurement of the first measurement type. The maximum time available for the measurement of the first measurement type is determined by scaling of a remaining time during which the UE is configured not to perform the at least one of a measurement of the second measurement type and a measurement of the third measurement type. The required time and the remaining time form different parts of the time available for measurements.

Advantages of Embodiments Herein

Embodiments herein provide a framework in which it is possible to set a reasonable requirement on the time duration for evaluating autonomous reselection to a CSG cell, whilst scaling and meeting the requirements on other cell reselection measurements. It also enables autonomous reselection to be integrated into the specifications in such a manner that mobility performance is not deteriorated. This results in that an improved performance in a wireless communications network using CSG is provided. More specifically while performing autonomous CSG search or reselection to the CSG cell, the UE shall also perform the existing cell reselection procedure in parallel and meet the corresponding requirements. This is achieved by intelligently sharing time between different measurement procedures. Meeting the existing requirements means that existing network mobility parameters can be re-used for all UEs, including both UEs that do CSG autonomous search and UEs that do not do CSG autonomous search.

FIGURES

FIG. 14 is a block diagram illustrating embodiments herein.

DETAILED DESCRIPTION

Terminologies

Figure 1:
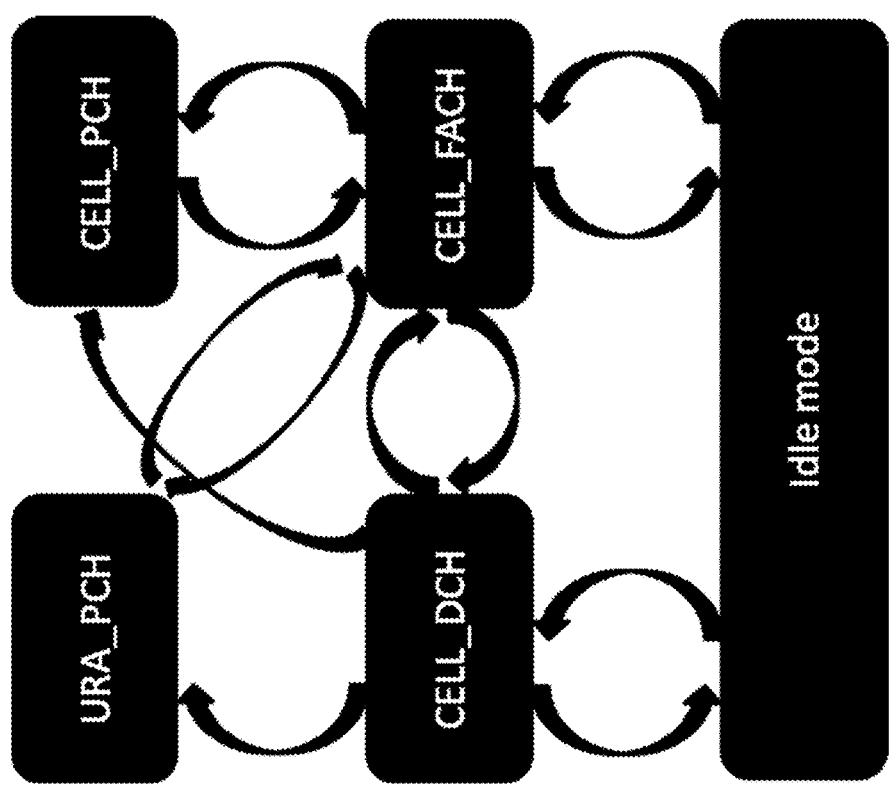
FIG. 1 is a schematic block diagram illustrating UE RRC states according to prior art.

The following commonly defined terminologies are used in the embodiments and are elaborated below:

Radio network node: In some embodiments the non-limiting term radio network node is more commonly used and it refers to any type of network node serving a UE and/or connected to other network node or network element or any radio node from where the UE receives a signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, Remote Radio Units (RRU), Remote Radio Heads (RRH), nodes in distributed antenna system (DAS) etc.

Network node: In some embodiments a more general term "network node" is used and it may correspond to any type of radio network node or any network node, which communicates with at least a radio network node. Examples of network nodes are any radio network node stated above, core network node, (e.g. Mobile switching center (MSC), Mobile Management Entity (MME) etc), Operation & Maintenance (O&M), Operation Support Subsystem (OSS), Self Organizing Network (SON), positioning node (e.g. Evolved Serving Mobile Location Centre (E-SMLC)), Minimization of Drive Test (MDT) etc.

User equipment: In some embodiments the non-limiting term user equipment (UE) is used and it refers to any type of wireless device communicating with a radio network node in a cellular or mobile communication system. Examples of UEs are target device, device to device UE, machine type UE or UE capable of machine to machine communication, Personal Digital Assistant (PDA), tablet computers, e g iPAD, mobile terminals, smart phone, Laptop Embedded Equipped (LEE), laptop mounted equipment (LME), Universal Serial Bus (USB) dongles etc.

Also note that terminology such as eNodeB and UE should be considered non-limiting and does in particular not imply a certain hierarchical relation between the two; in general "eNodeB" could be considered as device 1 and "UE" device 2, and these two devices communicate with each other over some radio channel. Also, the embodiments herein are equally applicable to wireless transmissions in the downlink and in the uplink.

In this section, the embodiments herein will be illustrated in more detail by a number of exemplary embodiments. It should be noted that these embodiments are not mutually exclusive, but may be combined in a suitable way.

Embodiments herein are described in terms of examples and a list of generic features. These examples may be specified as pre-defined rules or specified rules in the standard. The pre-defined rules may be implemented in user equipment (UE), such as the UE 120 shown in FIG. 7, compliant to the standard. The UE described in the text below may e.g. be the UE 120. The UE may be any wireless device such as a USB-dongle, smart phone, tablet, target device, mobile terminal, wireless terminal, wireless terminal used for machine type communication, wireless device used for device to device communication, customer premises equipment (CPE) etc.

Some embodiments herein relate to measurement rules in CELL FACH with autonomous CSG cell reselection.

In general the pre-defined rules enable the UE in CELL_FACH state and in DRX mode to utilize available time for doing various kinds of measurements comprising CSG measurements, e.g. CSG cell search etc, low/equal priority mobility measurements and higher priority measurements performed on inter-frequency and/or inter-RAT carrier frequencies.

Figure 7:
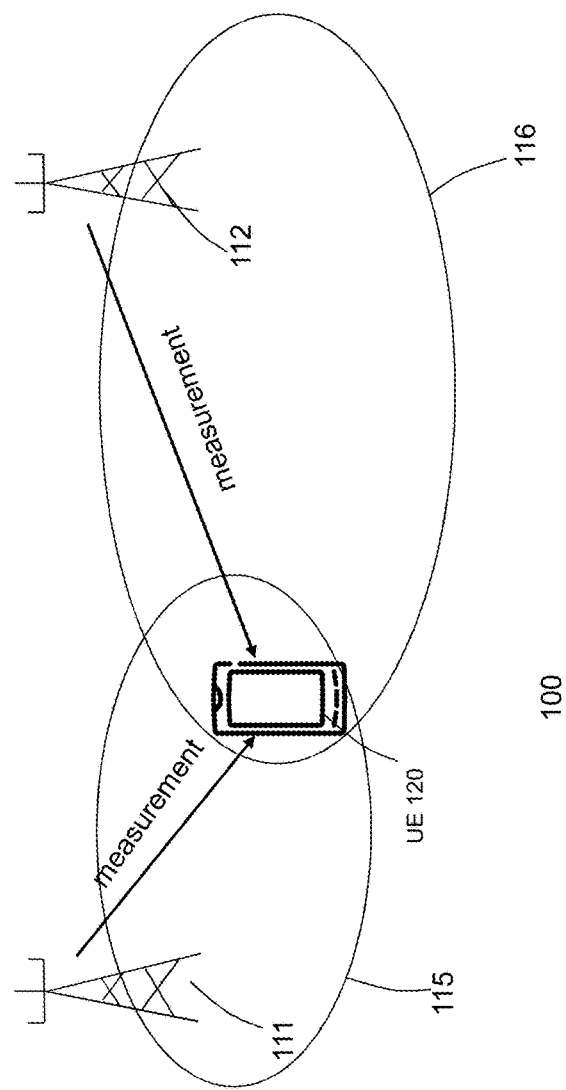
FIG. 7 is a block diagram illustrating embodiments of a communications network.

FIG. 7 depicts an example of a wireless communications network in which embodiments herein may be implemented. The wireless communications network 100 is a WCDMA network but the teachings presented herein may be equally applicable to other wireless communication networks, such as an LTE network, GSM network, any other 3GPP cellular network, Wimax, or any cellular network or system.

Figure 2:
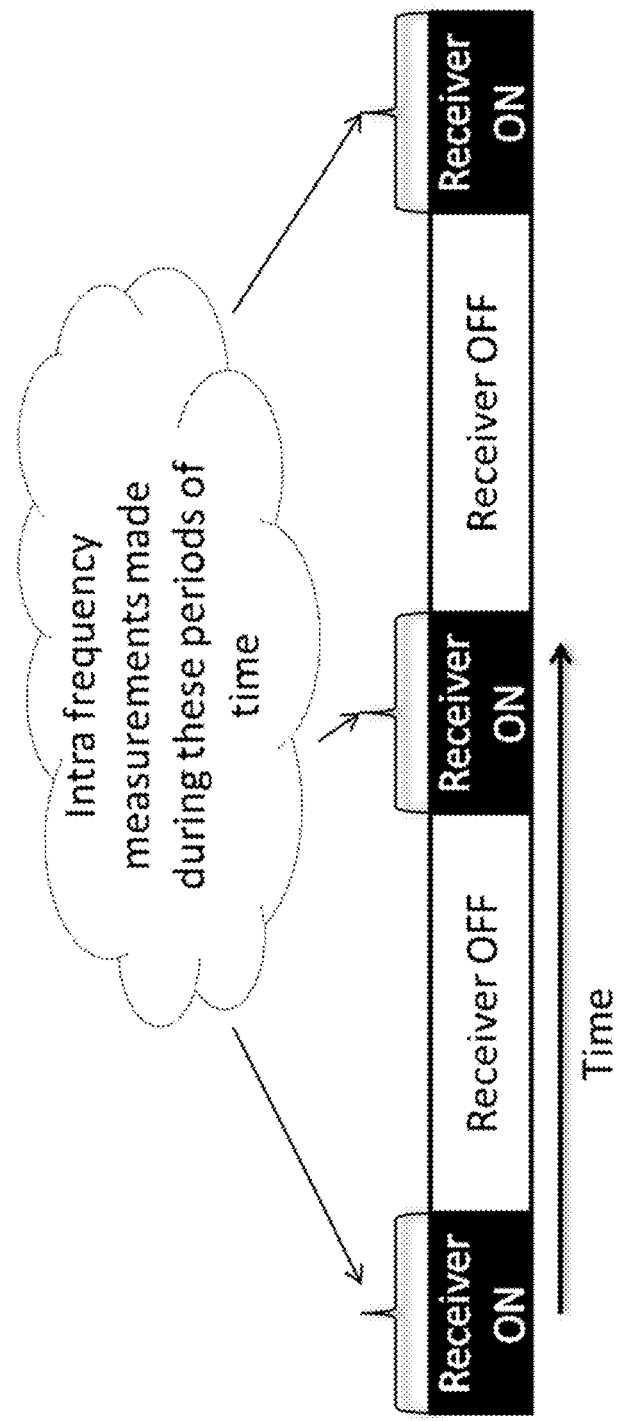
FIG. 2 is a schematic block diagram illustrating allocation of time for gathering L1 and L3 filter samples for intra-frequency measurements according to prior art.

The wireless communications network 100 comprises a plurality of network nodes whereof two, a first network node, referred to herein as a network node 111 and a second network node 112 are depicted in FIG. 2. The first network node 111 and the second network node 112 may each be a transmission point of a radio base station, for example a Node B, an eNB, an eNodeB, or an Home Node B, an Home eNode B or any other network node capable to serve a user equipment or a machine type communication device in a wireless communications network. The network node 111 serves a first cell, referred to as a cell 115. The network node 112 serves a second cell 116.

A UE 120 is located in the cell 115 served by the network node 111. The user equipment 120 may e.g. be a mobile terminal or a wireless terminal, a mobile phone, a computer such as e.g. a laptop, a Personal Digital Assistant (PDA) or a tablet computer, sometimes referred to as a surf plate, with wireless communication capability, or any other radio network units capable to communicate over a radio link in a wireless communications network. Please note the term user equipment used in this document also covers other wireless devices such as Machine to Machine (M2M) devices, even though they may not be directly operated by a user.

The UE 120 is served by the network node 111. In order to perform cell reselection when necessary, the UE 120 measures the received signal quality from its own cell, i.e. its serving network node or base station 111, from neighbor cells and from cells on other Radio Access Technology (RAT)s or carriers. Any of the neighbor cells and the cells on other Radio Access Technology (RAT)s or carriers may e.g. be served by the second network node or base station 112.

In some cases, it may be that the amount of measurement time available for measurement on a CSG carrier is insufficient to meet a reasonable requirement on the time duration for evaluating CSG reselection conditions.

In other cases, it may be that the amount of RX OFF time is sufficient for meeting CELL_FACH requirements and making additional measurements and meeting CSG requirements. In this case, the CELL_FACH measurements are not scaled, but the existing requirement is still met.

Embodiments herein allow to accommodate autonomous CSG selection in CELL_FACH state whilst appropriately modifying measurement requirements and preserving mobility performance.

Embodiments herein allows for scaling of measurement requirements for autonomous CSG reselection and potentially higher priority measurements, whilst not scaling other types of measurements, such as low priority measurements, depending on how much time is available for inter-frequency and inter-RAT measurements and the type of measurement. This differs from the existing method of scaling all measurements when a large number of frequencies must be measured. Scaling refers to lengthening, or shortening, a requirement, e.g. a requirement on time permitted for measurement, compared to what would be the case if no additional measurement that is not included in the measurements to be done according to the requirement would be necessary, e.g. if no CSG measurement would be necessary. The term scaling may be explained with an example. Assume a measurement requirement, e.g. CPICH measurement period, is 1000 ms when no CSG measurement is to be performed. If CSG measurement is done then this requirement, i.e. CPICH measurement period, could be extended by e.g. a scaling factor of 1.5. This means that the scaled CPICH measurement period becomes 1500 ms when CSG measurement is also done, while CPICH measurement is also made by the UE 120. Principles may e.g. be:

If the DRX cycle OFF time is long enough such that it is possible to make all mobility and high priority measurements with the current requirements and to make additional CSG measurements with a reasonable requirement comprising a measurement time which is below a threshold, then the CELL_FACH measurement requirements that are not related to autonomous CSG selection are not scaled. The time for CSG measurements is scaled.

If the DRX cycle OFF time is insufficient to do the above, or measurement occasions are configured, then measurements required for mobility, (i.e. measurements of the second measurement type) are performed with the current requirements in order that mobility requirements are retained, whilst the remaining measurement time is used for higher priority measurements and CSG measurements. The measurement occasions are configured at the UE for doing measurements especially when no DRX cycle is used. During a measurement occasion the UE is not scheduled. The higher priority and CSG measurement requirements are scaled according to the amount of time available for performing them.

A few terms used herein are defined below:

First measurement type=autonomous CSG cell search, measurement and reselection. CSG cell may be on any of the carriers, i.e. low, equal, higher priority carriers, in the measurement configuration for the UE or on any other carrier not included in the measurement configuration.

Second measurement type=mobility measurements, i.e. low or equal priority carriers Third measurement type=higher priority measurements, i.e. measurements performed relatively seldom, e.g. once every minute on carrier of higher priority than that of serving carrier.

First pre-defined requirements, also referred to as first defined requirements=existing requirements for certain measurement.

Second pre-defined requirements, also referred to as second defined requirements=relaxed requirements or worse, for example less strict, requirements for certain measurement e.g. longer measurement period, longer cell search delay compared to the first pre-defined requirements, worse measurement accuracy compared to the first pre-defined requirements.

Relaxed means that the requirement becomes worse, e g longer time given, compared to the first pre-defined requirements. In one example the time duration within which the measurement must be completed is lengthened. For example a relaxed requirement would mean extending the measurement period of a CPICH measurement from 1000 ms to 2000 ms. In another example a relaxed requirement would result in that the measurement accuracy of CPICH measurement, i.e. CPICH RSCP and/or CPICH Ec/No, is reduced from +/−3 dB to +/−4 dB i.e. by +/−1 dB.

To begin with, methods according to embodiments herein will first be described in a general way as seen from the view of the UE 120 and then as seen from the network node 111. This will be followed by a more detailed description and examples.

Figure 8:
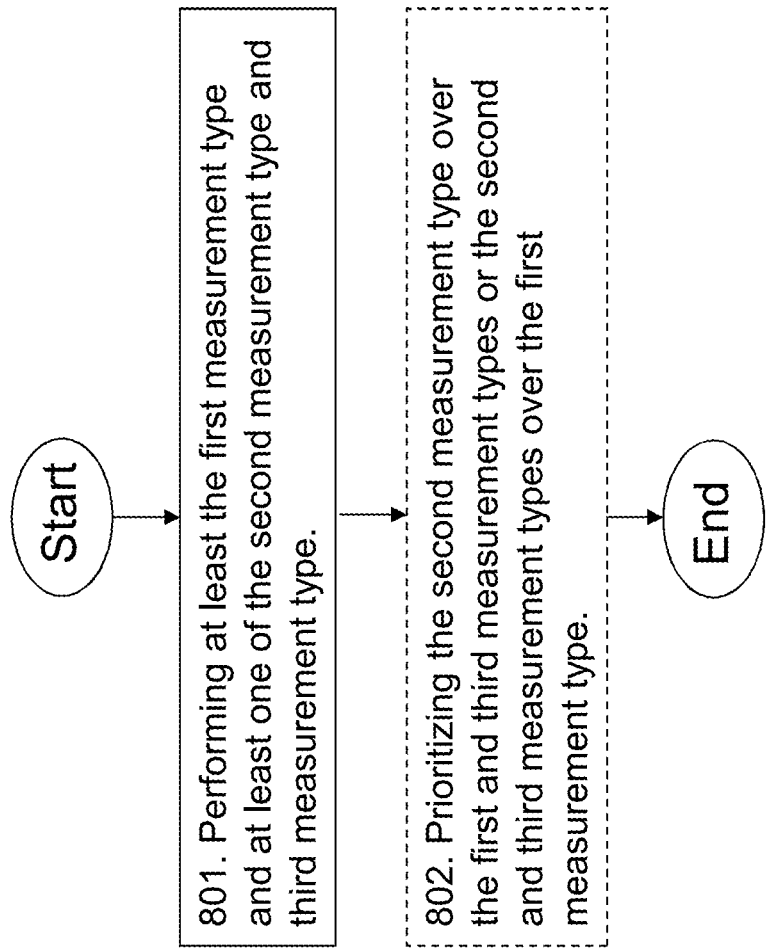
FIG. 8 is a flowchart illustrating embodiments of a method in a UE.

Thus example of embodiments of a method in the UE 120 of performing measurements of a plurality of measurement types will now be described with reference to the block diagram in FIG. 7 and a flowchart depicted in FIG. 8. As mentioned above the UE 120 is served by a network node 111 on a serving carrier frequency. The UE 120 may in some embodiments be served by the network node 111 on the serving carrier frequency in a cell when being in a CELL_FACH state. In further embodiments, the UE 120 may be configured with DRX.

The method comprises the following actions, which actions may be taken in any suitable order. Dashed lines of a box in FIG. 8 indicate that this action is not mandatory.

Action 801

In order to perform cell reselection in an example scenario, the UE 120 measures the received signal quality from its own cell, i.e. the network node 111, and from neighbor cells and/or from cells on other Radio Access Technology (RAT)s or carriers. At least one of the cells upon measurements are to be made is a CSG cell and at least one of mobility measurements and higher priority measurements are to be performed in addition to the measurements on the CSG cell. Thus the UE 120 performs a measurement of a first measurement type and at least one of a measurement of a second measurement type and a measurement of a third measurement type. The measurement of the first measurement type is performed on at least one CSG cell. The measurement of the second measurement type is performed on at least one carrier frequency of low or equal priority compared to that of the serving carrier frequency. The measurement of the third measurement type is performed on at least one carrier frequency of higher priority compared to that of the serving carrier frequency. The measurements are performed according to (a) and (b) below:

a The at least one of a measurement of the second measurement type and a measurement of the third measurement type is performed during a required time such that first pre-defined requirements for the at least one of a measurement of the second measurement type and a measurement of the third measurement type are met. The required time forms part of a time available for measurements. The time available for measurements is a time period during which a receiver of the UE 120 does not need to be tuned to the camped cell, i. e. the own cell served by the network node 111. The required time is the part of the available time for measurements that the UE needs for performing the at least one of a measurement of the second measurement type and a measurement of the third measurement type in order to obtain a measurement result with a pre-defined measurement accuracy and within a pre-defined elapsed time, denoted measurement duration.

In one example, where the UE is configured with DRX, the required time may be formed by defining or identifying a part of an OFF period in a DRX cycle during which the UE has to measure in order to, by measuring during such part in a number of OFF periods in the DRX cycle, get a sufficient total amount of receiver time for obtaining the measurement result with a pre-defined measurement accuracy and within a pre-defined elapsed time in form of time duration of the OFF periods of the DRX cycle where the at least one of a measurement of the second measurement type and a measurement of the third measurement type is performed and time duration of ON periods of the DRX cycle that occur in between the OFF periods.

In another example, the required time may be formed by defining or identifying a part of a configured measurement occasion during which the UE has to measure in order to, by measuring during such part in a number configured measurement occasions, get a sufficient total amount of receiver time for obtaining the measurement result with a pre-defined measurement accuracy and within a pre-defined elapsed time in form of time duration of the measurement occasions where the at least one of a measurement of the second measurement type and a measurement of the third measurement type is performed and time that is not part of the measurement occasions that elapses in between such measurement occasions.

The first pre-defined requirements are met when the measurement result is obtained at the pre-defined measurement accuracy and within the pre-defined elapsed time or measurement duration.

b The measurement of the first measurement type is performed during a remaining time, during which the at least one of a measurement of the second measurement type and a measurement of the third measurement type is not performed. The required time and the remaining time form different parts of the time available for measurements. The remaining time is a part of the available time for measurements that is not needed by the UE for performing the at least one of a measurement of the second measurement type and a measurement of the third measurement type in order to obtain a measurement result with a pre-defined measurement accuracy and within a pre-defined elapsed time, denoted measurement duration.

In one example, where the UE is configured with DRX, the remaining time may be formed by defining or identifying a part of an OFF period in a DRX cycle during which the UE does not need to measure in order to get a sufficient total amount of receiver time for obtaining the measurement result for the at least one of a measurement of the second measurement type and a measurement of the third measurement type such that the first pre-defined requirements are met. The UE may then get sufficient total amount of receiver time for performing the measurement of the first measurement type during the remaining time by measuring during such part in a number of OFF periods in the DRX cycle during a lengthened measurement duration, i.e. a lengthened elapsed time in form of time duration of the OFF periods of the DRX cycle where the measurement of the first measurement type is performed and time duration of ON periods of the DRX cycle that occur in between the OFF periods, as compared to the measurement duration of the at least one of a measurement of the second measurement type and a measurement of the third measurement type.

In another example, the remaining time may be formed by defining or identifying a part of a configured measurement occasion during which the UE does not need to measure in order to get a sufficient total amount of receiver time for obtaining the measurement result for the at least one of a measurement of the second measurement type and a measurement of the third measurement type such that the first pre-defined requirements are met. The UE may then get sufficient total amount of receiver time for performing the measurement of the first measurement type during the remaining time by measuring during such part in a number of configured measurement occasions during a lengthened measurement duration, i.e. a lengthened elapsed time in form of time duration of the configured measurement occasions where the measurement of the first measurement type is performed and time that is not part of the measurement occasions that elapses in between such measurement occasions, as compared to the measurement duration of the at least one of a measurement of the second measurement type and a measurement of the third measurement type.

In a further embodiment, the measurements of the first measurement type may be performed such that second pre-defined requirements are fulfilled. The second pre-defined requirements may in some embodiments be more relaxed than the first pre-defined requirements. The second pre-defined requirements may for example be more relaxed than the first pre-defined requirements in that the measurement duration, i.e. the time duration within which the measurement of the first measurement type must be completed, is lengthened as compared to the measurement duration of the first pre-defined requirements. Additionally or alternatively, the second pre-defined requirements may be more relaxed than the first pre-defined requirements in that the required accuracy, or number of measurement samples, is reduced, as compared to the required accuracy, or number of measurement samples, of the first pre-defined requirements.

The first pre-defined requirements may or may not be met by the measurement of the first measurement type, depending on how much of the available time for measurements that is remaining time during which the UE may get a sufficient total amount of receiver time for obtaining the measurement result of the measurement of the first measurement type.

The measurement of the first measurement type may be performed on at least one CSG cell for cell reselection to that CSG cell. In some embodiments, the cell reselection may be made from a non-CSG cell, i.e. when the UE 120 is served by the network node 111 in a non-CSG cell. The CSG cell may use or operate on any one of an inter-frequency carrier and an inter-RAT carrier frequency relative to the serving carrier frequency of the network node 111.

The method may be performed during a Discontinuous Reception, DRX, cycle. The DRX cycle comprises periods of receiver ON time and periods of receiver OFF time. The periods of receiver OFF time are typically interrupted by the periods of receiver ON time of the DRX cycle.

In some embodiments, the time available for measurements comprises periods of receiver OFF time of the DRX cycle. In these embodiments, the required time comprises parts of at least a subset of the periods of receiver OFF time of the DRX cycle, and the remaining time comprises parts of the periods of receiver OFF time that are not comprised in the required time.

Scaling Factors

In some embodiments, the at least one of a measurement of a second measurement type and a measurement of a third measurement type is a measurement of the second measurement type and a measurement of the third measurement type is performed in addition to the measurement of the first measurement type during the remaining time of the time available for measurements. In these embodiments, respective maximum times available for the measurements of the first and third measurement types are determined by scaling of the remaining time, being an available time, T, for performing the measurements of the first and third measurement types, by scaling factors $\tau 1$ and $\tau 3$ respectively, wherein the maximum times available for the measurements of the first and third measurement types are expressed as $\tau 1 * T$ and $\tau 3 * T$ respectively.

In some of these embodiments, the measurements of the first and third measurement types are performed during the remaining time such that at least one of the first pre-defined requirements and the second pre-defined requirements are met for the measurements of the first and third measurement types depending upon the values of T, $\tau 1$ and $\tau 3$. The first pre-defined requirements may be more stringent than the second pre-defined requirements. In these embodiments, the first pre-defined requirements are met:

a. for the first measurement type when none of the measurement of the second and third measurement types are performed and b. for the third measurement type when no measurement of the first measurement type is performed.

The values of the scaling factors $\tau 1$ and $\tau 3$ may be pre-defined or configured by the network node 111. The values of the scaling factors $\tau 1$ and $\tau 3$ may depend upon one or more of the following:

a. Whether a DRX cycle is used or not;

b. a Length of the DRX cycle;

c. the DRX cycle's duration of receiver ON time during which the UE 120 is configured to receive signals from the network node 111.

d. the relation between the length of the DRX cycle and duration of receiver ON time of the DRX cycle.

Remaining Time

In some embodiments, the remaining time for performing the measurement of the first measurement type depends upon one or more of the following:

a. Whether a DRX cycle is used or not;

b. a Length of the DRX cycle;

c. the DRX cycle's duration of receiver ON time during which the UE 120 is configured to receive signals from the network node 111.

d. the relation between the length of the DRX cycle and duration of receiver ON time of the DRX cycle.

The measurement of the first measurement type may be an autonomous search of a CSG cell when at least one CSG Identity (ID) included in a CSG whitelist is provided to the UE 120 for cell reselection from a non-CSG cell to the CSG cell.

The at least one of a measurement of the second measurement type and a measurement of the third measurement type may be performed on non-CSG cells.

The at least one of a measurement of the second measurement type and a measurement of the third measurement type may comprise a measurement of the third measurement type that is performed by searching a cell on a higher priority carrier frequency periodically.

In some embodiments, the UE 120 is configured to operate in a low activity Radio Resource Control, RRC, state. The low activity RRC state may be any one of an idle mode, URA_PCH, CELL_PCH and CELL_FACH.

In some embodiments, the first and/or second pre-defined requirements specifies any one or more of: a cell identification delay, physical layer measurement period, measurement accuracy, measurement reporting delay, applicable signal quality target for doing measurement and number of identified cells required to be measured by the UE 120.

Action 802

Part of the action 801 above may be seen as a prioritization action. This is an optional action. The prioritizing action may be referred to as:

The UE 120 may prioritize the second measurement type over the first and third measurement types, wherein the prioritization may comprise:

meeting the first pre-defined requirements for the second measurement type, wherein first pre-defined requirements are also met when none of the first or second measurement types are performed, and.

performing the first and third measurement types by sharing the available time, T, which is the remaining time after performing the second measurement type.

Or as an alternative:

The UE 120 may prioritize the second and third measurement types over the first measurement type, wherein the prioritization may comprise:

meeting the first pre-defined requirements for the second and third measurement types, wherein first pre-defined requirements are also met when none of the first or second measurement types are performed, and performing the first measurement type by using the remaining time after performing the second and third measurement types Note that the term pre-defined may also be referred to as defined.

Figure 9:
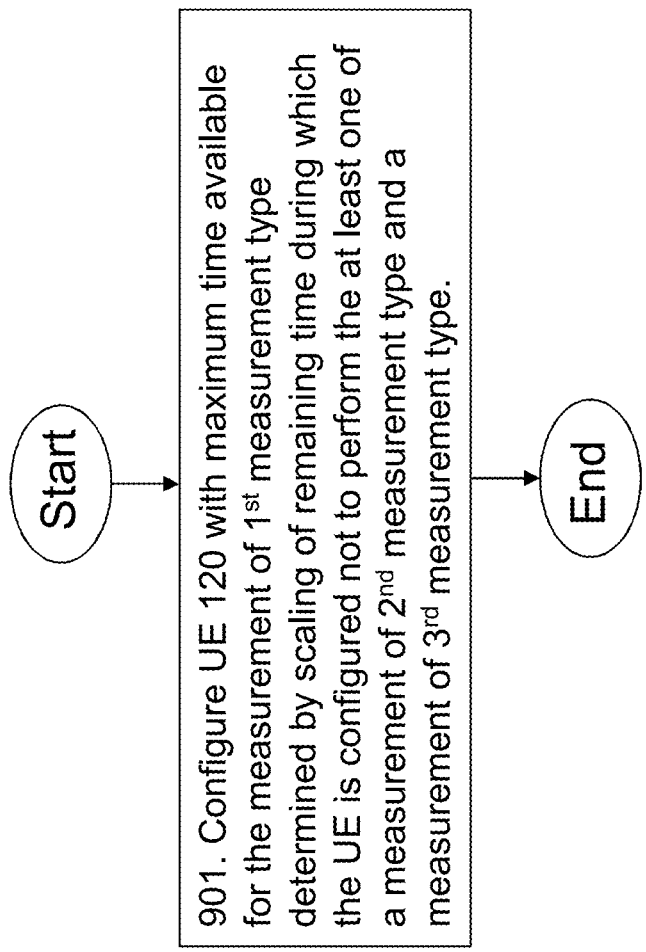
FIG. 9 is a flowchart illustrating embodiments of a method in a network node.

A method according to embodiments herein will now be described in a general way as seen from a view of the network node 111. Thus example of embodiments of a method in the network node 111, for configuring the UE 120 to perform measurements of a plurality of measurement types will be described with reference to a flowchart depicted in FIG. 9. As mentioned above, the UE 120 is served by the network node 111 on a serving carrier frequency. The UE 120 may in some embodiments be served by the network node 111 on the serving carrier frequency in a cell when being in a CELL_FACH state. In further embodiments, the UE 120 may be configured with DRX.

The measurements of the plurality of measurement types comprise a measurement of a first measurement type and at least one of a measurement of a second measurement type and a measurement of a third measurement type. The measurement of the first measurement type is performed on at least one CSG cell, the measurement of the second measurement type is performed on at least one carrier frequency of low or equal priority compared to that of the serving carrier frequency, and the measurement of the third measurement type is performed on at least one carrier frequency of higher priority compared to that of the serving carrier frequency. The at least one of a measurement of the second measurement type and a measurement of the third measurement type is to be performed by the UE during a required time such that first pre-defined requirements for the at least one of a measurement of the second measurement type and a measurement of the third measurement type are met. The required time forms part of a time available for measurements.

The method comprises the following action.

Action 901

The network node 111 configures the UE 120 with a maximum time available for the measurement of the first measurement type. The maximum time available for the measurement of the first measurement type is determined by scaling of a remaining time during which the UE is configured not to perform the at least one of a measurement of the second measurement type and a measurement of the third measurement type. The required time and the remaining time form different parts of the time available for measurements.

In some embodiments, the at least one of a measurement of a second measurement type and a measurement of a third measurement type is a measurement of the second measurement type and a measurement of the third measurement type is performed in addition to the measurement of the first measurement type during the remaining time of the time available for measurements. In these embodiments, the configuring 901 further comprises configuring the UE 120 with a maximum time available for the measurement of the third measurement type, and the respective maximum times available for the measurements of the first and third measurement types are determined by scaling of the remaining time, being an available time, T, for performing the measurements of the first and third measurement types, by scaling factors $\tau 1$ and $\tau 3$ respectively. The maximum times available for the measurements of the first and third measurement types are expressed as $\tau 1*T$ and $\tau 3*T$ respectively.

In some of these embodiments, the first or second pre-defined requirements are to be met for the measurement of the first and third measurement types depending upon the values of T, $\tau 1$ and $\tau 3$, and the first pre-defined requirements may be more stringent than the second pre-defined requirements and the first pre-defined requirements are to be met for the first measurement type when none of the measurements of the second and third measurement types are performed and for the third measurement type when no measurement of the first measurement type is performed.

As mentioned above, the values of the scaling factors $\tau 1$ and $\tau 3$ may depend upon one or more of the following:

a. Whether a DRX cycle is used or not;

b. a Length of a DRX cycle;

c. the DRX cycle's duration of receiver ON time during which the UE 120 is configured to receive signals from the network node 111.

d. the relation between the length of a DRX cycle and duration of receiver ON time of the DRX cycle.

Embodiments herein will now be described more in detail with examples. The following text relates to any suitable embodiments above or below.

Performing CSG Measurements

A first example is one in which DRX is configured with a receiver OFF time that is larger than the receiver ON time. In this case, the existing requirements for CELL_FACH measurements are based on assuming a portion of the OFF time that is as long as the ON time duration is used for inter-frequency and inter-RAT measurements. The remainder of the OFF time is available for CSG measurements, being an example of a measurement of the first measurement type. In the specific example depicted in FIG. 10, inter-frequency measurements are required on 2 carriers. In this case, the UE 120 is required to prioritize meeting the existing requirements, e.g. the total receiver time required for all L1 and L2/L3 filtering for inter-frequency measurement on carrier 1, 1001 and carrier 2, 1002 for higher and lower priority measurements, being examples of measurements of the third and second measurement types. The UE 120 may therefore use additional time for obtaining measurement samples for autonomous CSG measurements, e.g. the total receiver time required for all L1 and L2/L3 filtering for CSG measurements if in proximity of a CSG cell, 1003. For obtaining the additional measurement samples the UE 120 uses RX OFF time that is in addition to the time during which the UE is assumed or expected to make other inter-frequency and inter-RAT measurements.

Figure 10:
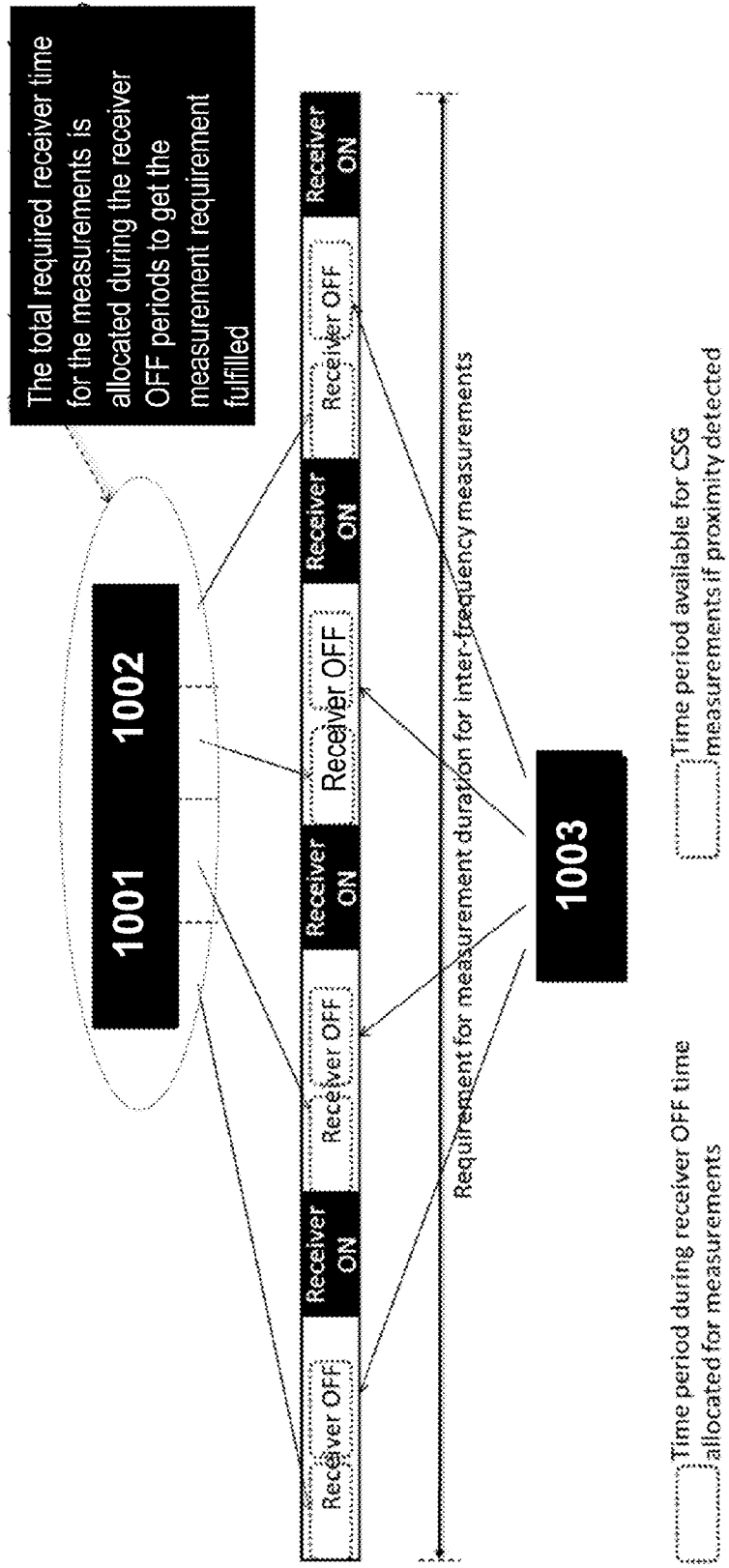
FIG. 10 is a schematic block diagram illustrating an example 1: Sufficient time available for making CSG measurements without compromising existing requirements.

FIG. 10 depicts Example 1 wherein sufficient time is available for making CSG measurements without compromising existing requirements.

In a second example, the receiver OFF time is of about the same duration as the receiver ON time. The quality in the serving cell 115 is high enough meaning that lower priority, mobility related measurements, i.e. measurements on inter-frequency/inter-RAT carriers with lower priority, being an example of a measurement of the second measurement type, are not required. In this case, the available time for measurements is divided between higher priority reselection measurements, being an example of a measurement of the third measurement type, and CSG measurements, being an example of a measurement of the first measurement type. Since higher priority measurements, i.e. measurements on inter-frequency/inter-RAT carriers with higher priority, are only made once per minute, there should be sufficient time for all measurements. In the specific example depicted in FIG. 11, inter-frequency measurements are required on 2 carriers. The UE 120 is required to prioritize meeting the existing requirement for the higher priority measurements, e.g. the total receiver time required for all L1 and L2/L3 filtering for interfrequency measurement on carrier 1, 1001 and carrier 2, 1002, and make autonomous CSG measurements e.g. the total receiver time required for all L1 and L2/L3 filtering for CSG measurements if in proximity of a CSG cell, 1003 by obtaining additional samples during OFF time.

Figure 11:
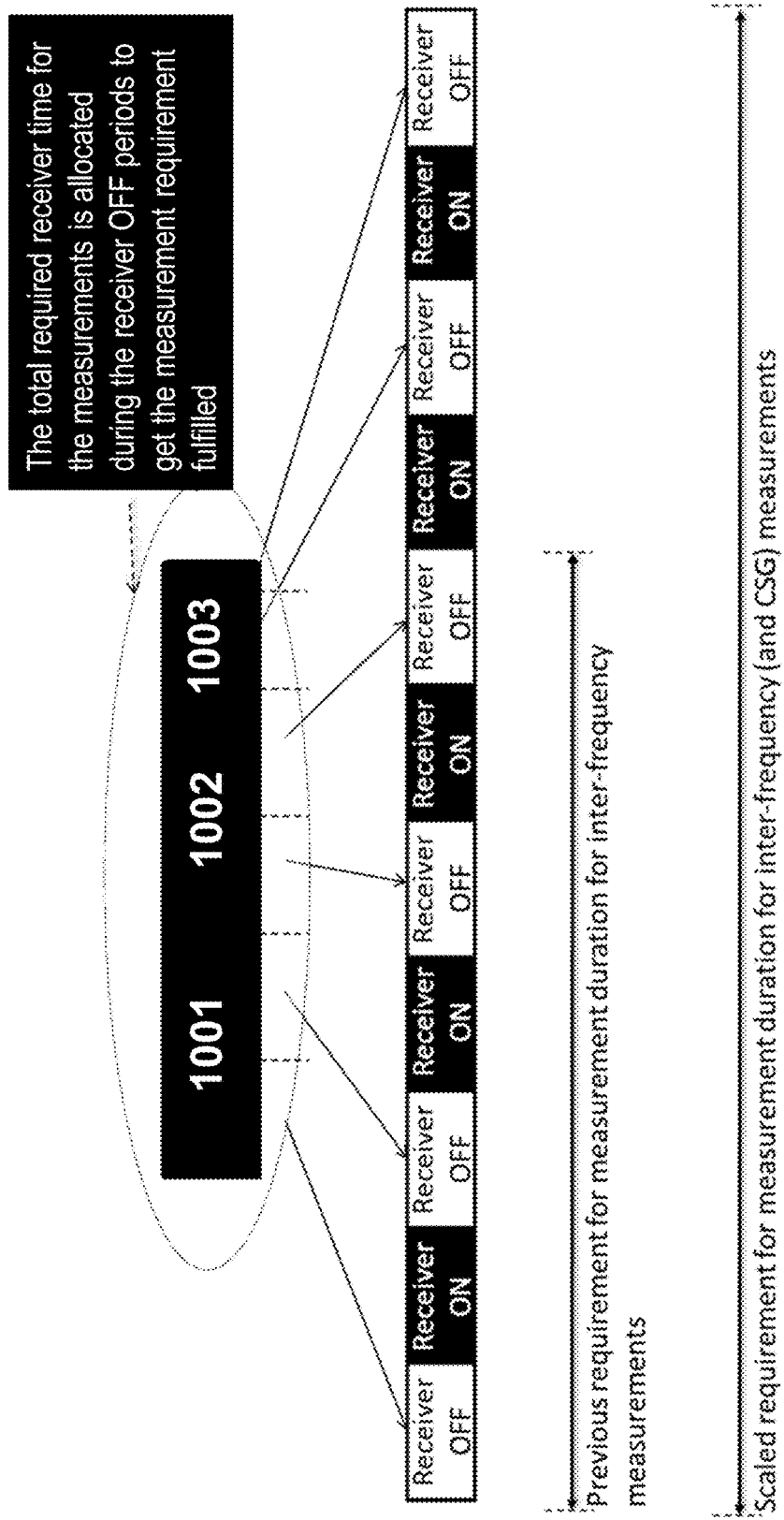
FIG. 11 is a schematic block diagram illustrating an example 2: When CSG proximity is detected, the requirements for higher priority and CSG measurements are scaled. Lower priority measurements are not required in this example.

FIG. 11 depicts Example 2. When CSG proximity is detected, the requirements for measurements on higher priority frequency layer being an example of a measurement of the third measurement type and CSG measurements being an example of a measurement of the first measurement type are scaled by allowing a longer time to complete the measurements, or reducing, i.e. allowing worse accuracy, the required accuracy of a measurement. The requirements for measurements on lower priority frequency layer being an example of a measurement of the second measurement type is not required.

According to some embodiments the reselection from non CSG to CSG cells may be performed by the UE 120 using autonomous cell search procedure when at least one CSG ID is included in the white list of CSG cells provided to the UE 120. In this case the UE 120 shall perform search and reselection to an allowed inter-frequency CSG cell that has met CSG reselection criterion and that is in its whitelist, within 6 minutes. These requirements related to search and reselection to an allowed inter-frequency CSG cell are only applicable when the 2nd DRX cycle is configured with a DRX cycle length of greater than e.g. 80 msec or 1280 msec. When performing autonomous CSG search or reselection to the CSG cell, the UE 120 shall also meet the existing cell reselection requirements for measurements other than autonomous CSG search or reselection.

In a third example, the receiver OFF time is again about the same duration as the ON time. However in this case the UE 120 is closer to the cell edge such as the cell edge of the serving cell 115 and the receive quality in the camped cell 115 is below a threshold at which lower priority measurements being an example of a measurement of the second measurement type should be made. In this case, 3 types of measurements are required; lower priority measurements being an example of a measurement of the second measurement type, and higher priority measurements being an example of a measurement of the third measurement type and autonomous measurements being an example of a measurement of the first measurement type. The requirement on the time duration within which reselection may be performed is calculated using the existing requirement for the lower priority mobility measurements in order to ensure that mobility performance is maintained. This is because the lower priority mobility measurements compared to higher priority measurements are done more regularly and thus primarily affect the mobility performance. Also in the specific example depicted in FIG. 12, interfrequency measurements are required on 2 carriers. Then, the requirements for high priority e.g. the total receiver time required for all L1 and L2/L3 filtering for interfrequency measurement on carrier 1, 1001 and carrier 2, 1002 and CSG related measurements e.g. the total receiver time required for all L1 and L2/L3 filtering for CSG measurements if in proximity, 1003 are scaled, i.e. lengthened, such that the requirement on mobility measurements can be maintained.

Figure 12:
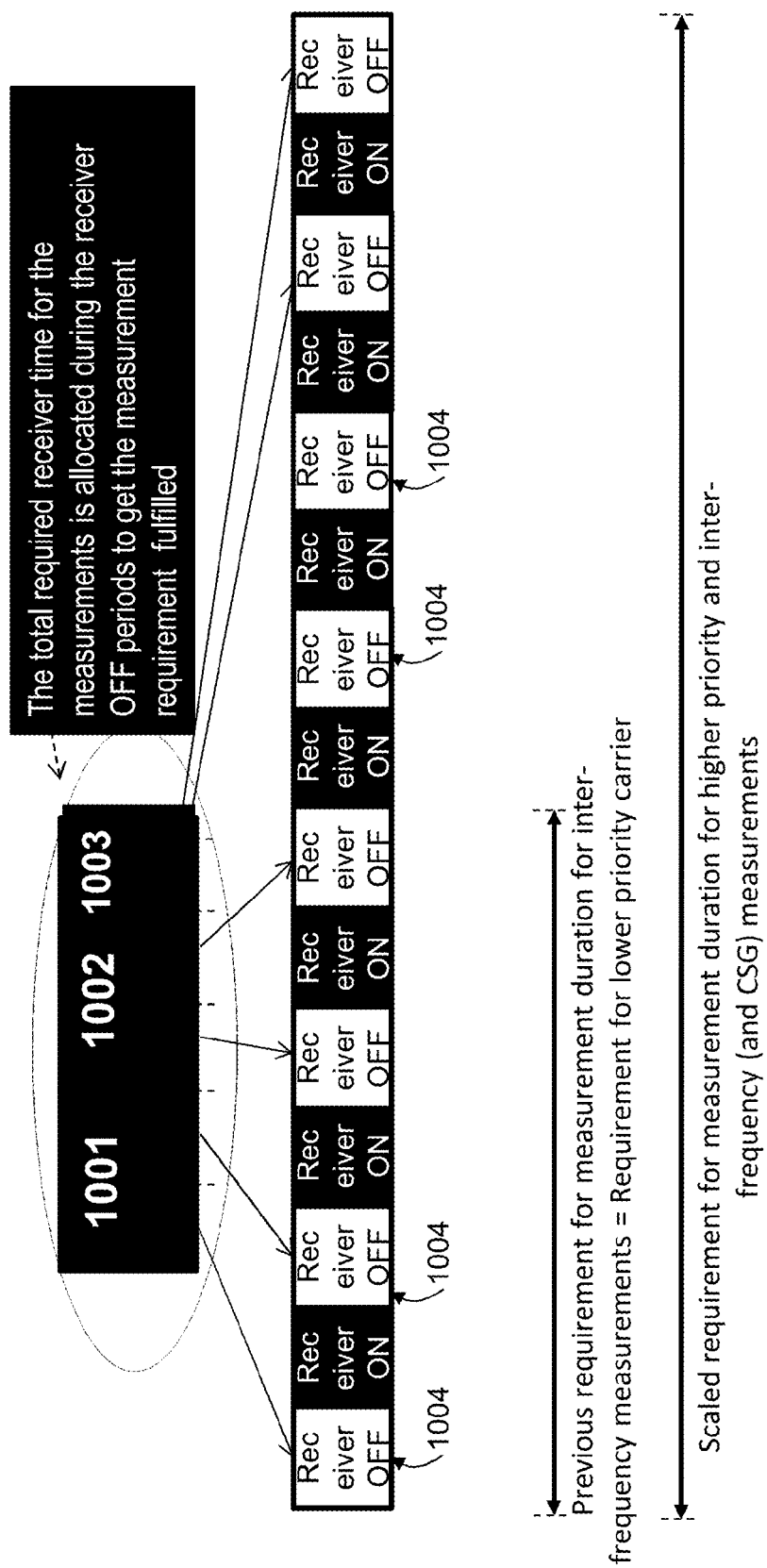
FIG. 12 is a schematic block diagram illustrating an example 3: Requirements for lower priority mobility measurements related reselection are maintained, whilst when CSG proximity is detected requirements for higher priority interfrequency and CSG measurements are scaled.

FIG. 12 depicts Example 3 wherein requirements for lower priority mobility related reselection are maintained, whilst when CSG proximity is detected requirements for higher priority intra-frequency and CSG are scaled.

As mentioned above, in the specific example depicted in FIG. 12, interfrequency measurements are required on 2 carriers. One carrier such as e.g. the first carrier, is lower priority and the second carrier is higher priority. For all of the L1 and L3 filtering, each carrier needs 2 RX OFF periods for re-tuning the receiver and making the measurements.

With no CSG monitoring, the total requirement for making the measurements and reselection decisions for both carriers requires 4 RX OFF periods.

When proximity to the CSG cell is detected, then measurements are also required on the CSG cell. The CSG in this case also requires 2 RX OFF periods for measurements. The mobility measurement may be repeated every 4 RX OFF periods, but the other measurements may be repeated every 8 RX OFF periods.

When proximity to the CSG cell is maintained, the same requirement is placed on cell reselection for the lower priority carrier, in order that mobility performance is maintained. This requires that the OFF times marked with 1004 are used for measurements on the lower priority carrier. The remaining OFF periods are used for measurements on the higher priority and the CSG carriers. Due to the need for measurements on the lower priority carriers and the sharing of the remaining OFF periods, the measurement requirement for the higher priority carrier and the CSG is extended, as shown in the figure.

Summary of Pre-Defined Rules

Traditionally when a UE performs different types of measurements, e.g. intra-frequency and inter-frequency etc., at least certain measurement requirements are relaxed compared to the case when only one type of measurement is performed especially in DRX. As described above, the second pre-defined requirements, are relaxed requirements, such as for example less strict or stringent requirements, for certain measurement e.g. by allowing longer measurement period, longer cell search delay compared to the first pre-defined requirements, worse measurement accuracy compared to the first pre-defined requirements.

The first two examples outlined above for CELL_FACH in DRX however ensure that when the UE 120 performs autonomous CSG measurements, e.g. CSG cell search such as the first measurement type, for CSG cell reselection, the other measurement requirements such as the second and/or third measurement types are not degraded compared to the case when no CSG measurements are performed by the UE 120. The other measurement requirements herein are related to inter-frequency and/or inter-RAT measurements done on carriers of at least low and/or equal priority such as the second measurement type. The other measurements may further comprise measurements done on carriers of higher priority such as the third measurement types. The CSG measurements however may be done on a CSG cell which may belong to any carrier frequency—that may not even be configured by the network node such as e.g. the network node 111. The pre-defined rules may require the UE 120 to have certain type of implementation which can ensure that the other measurement requirements are met. For example the UE 120 will have to adapt its measurement sampling depending upon whether CSG measurements are done in addition to the other measurements. The overall serving cell or neighbor cell measurement quantity results comprises averaging of 2 or more measurement samples, which are obtained at different times and typically obtained periodically. The exact sampling depends upon the implementation and is generally not specified. In practice the measurement samples, which are used for obtaining one measurement result for the same measurement type, are spread over time e.g. 2 samples over 80 msec or 1280 msec. That means samples from different measurement types can interleave with each other. The adaptation of measurement sampling for example may require the UE 120 to adapt or modify the time instance at which it obtains measurement samples on signals received from the cell such as the cell 115 and the second cell 116, and/or number of samples taken during certain time period and/or the time period over which certain number of samples are taken by the 120.

It is expected that within the Release 11 3GPP standardization, autonomous CSG selection will only be supported in combination with the DRX cycle being configured in CELL_FACH. However embodiments herein are generic to also consider e.g. measurement occasions being configured, to support any changes in scope during the standardization or future additions.

Specification of Pre-Defined Rules

The pre-defined rules for CSG reselection to a CSG cell on an inter-frequency carrier may be specified in the standard. Embodiments herein may be implemented in and be specified in TS 25.133 Rel-11 according to the following example: The UE in the example may relate to the UE 120.

5.5.2.4 Reselection to CSG Cells

Note: The requirements in this section are minimum requirements defined to ensure the testability of autonomous CSG search, and are only applicable when the $2^{nd}$ DRX cycle is configured with a DRX cycle length of greater than 80 msec or 1280 msec.

Reselection from non CSG to CSG cells may be performed using UE autonomous search as defined in TS 25.104 when at least one CSG ID is included in the UE's CSG whitelist. The requirements in this section are valid for reselection to CSG cells previously visited by the UE when the radio configuration parameters, including the carrier frequency and physical cell identity of the CSG cell, non CSG cell and other neighbour cells are unchanged from the most recent previous visit.

NOTE: According to TS 25.104, the UE autonomous search function, per UE implementation, determines when and/or where to search for allowed CSG cells.

5.5.2.4.1 Reselection from a Non CSG to an Inter-Frequency CSG Cell

The UE shall perform search and reselection to an allowed inter-frequency CSG cell that has met CSG reselection criterion defined in TS 25.104 and that is in its whitelist, within 6 minutes in the conditions shown in table 5.3A. There is no need for statistical testing of this requirement. When performing autonomous CSG search or reselection to the CSG cell, the UE shall also meet the existing cell reselection requirements defined in sections 4.2.2.1-4.2.2.10.

TABLE 5.3A

Parameters for CSG inter-frequency reselection

| Parameter | Unit | Cell 1 | Cell 2 |
|---|---|---|---|
| UARFCN[Note1] | [1] | [2] Channel 1 | [3] Channel 2 |
| CSG indicator | [4] | [5] False | [6] True |
| Primary scrambling code[Note1] | [7] | [8] Scrambling code 1 | [9] Scrambling code 2 |
| CSG identity | [10] | [11] Not sent | [12] Sent [13] (Already stored in UE whitelist from previous visit) |
| Propagation conditions | [14] | [15] Static, non multipath | |
| CSG cell previously visited by UE | [16] | [17] Yes | |
| | [18] | [19] | [20] |
| CPICH_RSCP[Note2] | [21] dBm | [22] −100 | [23] −100 |
| CPICH_Ec/Ior | [24] dB | [25] −10 | [26] −10 |
| PCCPCH_Ec/Ior | [27] dB | [28] −12 | [29] −12 |
| SCCPCH_Ec/Ior | [30] dB | [31] −12 | [32] −12 |
| AICH_Ec/Ior | [33] dB | [34] −15 | [35] −15 |
| SCH_Ec/Ior | [36] dB | [37] −15 | [38] −15 |
| PICH_Ec/Ior | [39] dB | [40] −15 | [41] −15 |
| $I_{oc}$ | [42] dBm/3.84 MHz | [43] Off | [44] Off |

[Note1]For this requirement to be applicable, the UARFCN and scrambling code for cell 1 and cell 2 shall be unchanged from when the CSG cell was visited previously.
[Note2]Chosen to ensure that CSG autonomous search has a high probability of success on every attempt made by UE.

Wherein:

UARFCN means UMTS absolute radio frequency channel number.

CSG indicator is the indicator signalled by CGS cell indicating that it is a CSG cell.

Primary scrambling code means scrambling code used by all downlink transmissions in a cell.

CSG identity (CSG ID) is an ID of CSG cell.

Propagation conditions i.e. radio conditions of CSG cell.

CSG cell previously visited by UE i.e. CSG cell to which the UE was previously connected or served by $E_c$ is Average energy per pseudo random noise (PN) chip.

$$\frac{E_c}{I_{or}}$$

The ratio of the average transmit energy per PN chip for different fields or physical channels to the AICH Acquisition Indication Channel PCCPCH Primary Common Control Physical Channel PICH Paging Indicator Channel SCH Synchronization Channel consisting of Primary and Secondary synchronization channels SCCPCH Secondary Common Control Physical Channel CPICH_RSCP CPICH Primary Common Pilot Channel $I_{oc}$ is the power spectral density (integrated in a noise bandwidth equal to the chip rate and normalized to the chip rate) of a band limited white noise source (simulating interference from cells, which are not defined in a test procedure) as measured at the UE antenna connector.

5.5.2.4.2 Reselection from a Non CSG to an Inter-RAT E-UTRA CSG Cell

The UE shall perform search and reselection to an allowed inter-RAT E-UTRA CSG cell that has met CSG reselection criterion defined in TS 25.104 and that is in its whitelist, within 6 minutes in the conditions shown in table 5.3B. There is no need for statistical testing of this requirement.

Advantages of Embodiments Herein

Embodiments herein provide a framework in which it is possible to set a reasonable requirement on the time duration for evaluating autonomous reselection to a CSG cell, whilst scaling and meeting the requirements on other cell reselection measurements. It also enables autonomous reselection to be integrated into the specifications in such a manner that mobility performance is not deteriorated.

The following text relates to Example of embodiments herein of autonomous CSG selection requirement.

If the UE 120 detects that it is in proximity to a CSG cell, then it needs to make measurements to determine whether it can reselect to the CSG cell and then to do so. If the CSG is not on any of the configured inter-frequency and inter-RAT carrier frequencies, then additional time will be required for the CSG measurements in preparation for the reselection.

In CELL_FACH the UE 120 may be configured with two DRX cycles. The length of the $2^{nd}$ DRX cycle is longer than that of the first one. The RX on time for the 2nd DRX cycle may be configured as 10 milliseconds (msec) or 20 msec. The DRX cycle length may be configurable to be 40 msec up to 5120 msec. If the DRX cycle length would be configured to it's maximum value of 40 msec and the RX on time to 20 msec, and the serving cell quality such that the UE 120 needs to make continuous lower and higher priority measurements such as the second and/or third measurement types, then all of the DRX time would be needed for the existing inter-frequency and inter-RAT measurements, and no time would be available for CSG measurements such as the first measurement type.

However, the combination of 20 msec ON time and 40 msec DRX length is unlikely to be a useful configuration for the 2nd DRX cycle. So in setting requirements for autonomous CSG selection, this configuration may be excluded. Furthermore, to reduce the risk of having insufficient time for CSG reselection, it may be provided that autonomous CSG reselection requirements should only be applied for DRX cycle lengths of >80 msec or >1280 msec, since these are the lengths of practical interest for this application.

For example, Requirements for autonomous CSG selection may only be applied when the 2nd DRX cycle length is e.g. >80 msec or >1280 msec.

Assuming that the DRX OFF time is much longer than the time in which the UE 120 must receive HS-PDSCH, i.e. ON time, then there may for example be two possibilities for how to integrate CSG measurements. The first possibility is that requirements are derived such that the total amount of DRX time in which the UE needs to tune to all other carriers on which measurements should be made is not increased. In this case, the CSG measurements will impact on the existing measurement requirements. The second possibility is that it is assumed that autonomous CSG selection related measurements are performed at other times than mobility measurements. This necessitates some more RX on time for the UE 120 when it detects that it is in proximity to a CSG and needs to make CSG measurements, but not at other times, whilst keeping the mobility behavior and parameters as they are without requiring change. In order to avoid the need for re-optimization of reselection parameters and uncertainty in UE 120 behavior due to different reselection behaviors depending on whether the UE 120 believes it is proximity to a CSG or not, the second option may be provided. I.e. CSG measurements if on a different carrier to existing measurements are made in DRX time that is additional to the DRX time required for existing measurements in order that existing measurement requirements are not impacted.

For example, CSG related interfrequency measurements may be made in additional DRX time to that required for reselection measurements, such that the requirement on reselection measurements remains unchanged.

The requirement for autonomous reselection to CSG in the current specifications may be 6 minutes. Given the restriction on applying the requirement to DRX cycles longer than 80 msec or 1280 msec as described in the example above, even in the case of the UE 120 continuously making mobility measurements in the worst case, where 80 msec or 1280 msec DRX and 20 msec ON time is configured, 3 minutes of measurement time are available for meeting a 6 minute requirement. It may be provided that the requirement for CSG autonomous reselection is not linked to DRX cycle parameters, apart from the restriction that the requirement is only applied when the configured DRX length is >80 msec or 1280 msec and is kept the same as for idle mode.

For example, for DRX cycle lengths above 80 msec, the requirement for autonomous reselection to CSG should be 60 seconds.

Figure 13:
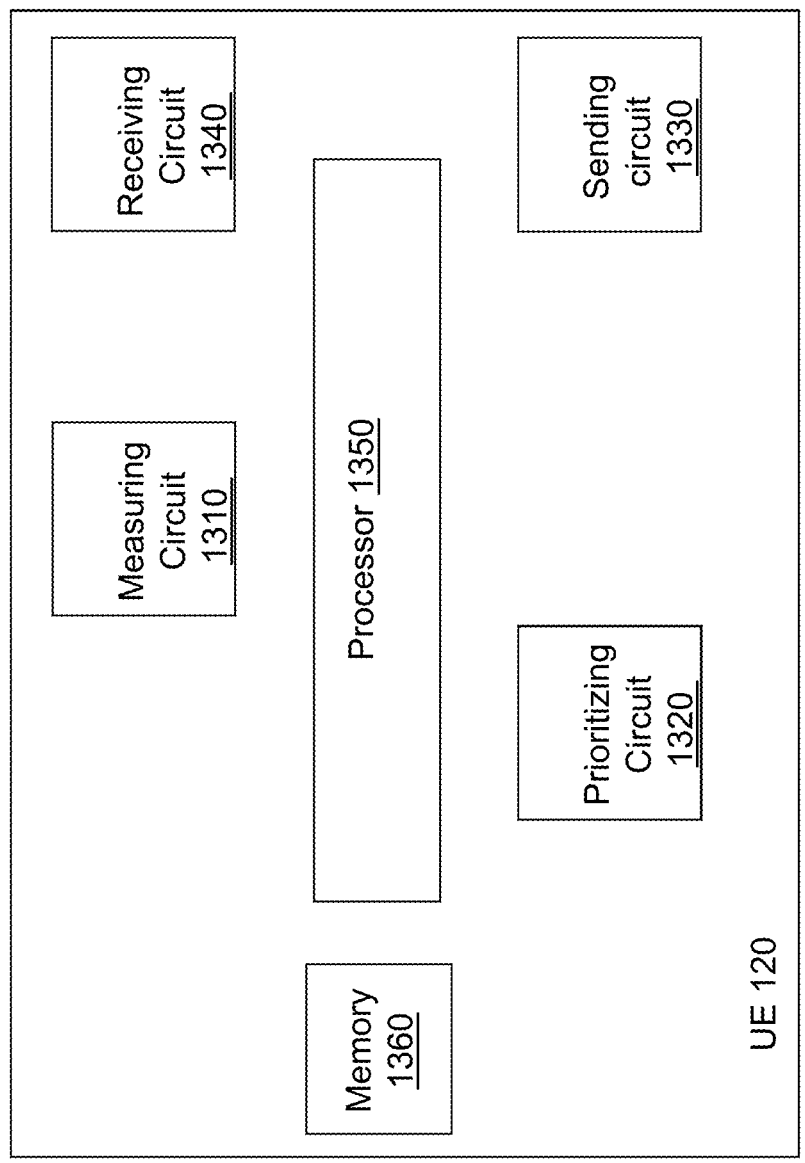
FIG. 13 is a block diagram illustrating embodiments herein.

To perform the method actions for performing measurements of a plurality of measurement types, described above in relation to FIG. 8, the UE 120 may comprise the following arrangement depicted in FIG. 13. As mentioned above the UE 120 is configured to be served by the network node 111 on a serving carrier frequency. The UE 120 may in some embodiments be served by the network node 111 on the serving carrier frequency in a cell when being in a CELL_FACH state. In further embodiments, the UE 120 may be configured with DRX.

The UE 120 is configured to perform a measurement of a first measurement type and at least one of a measurement of a second measurement type and a measurement of a third measurement type. The UE 120 is configured to perform the measurement of the first measurement type on at least one CSG cell, the measurement of the second measurement type on at least one carrier frequency of low or equal priority compared to that of the serving carrier frequency, and the measurement of the third measurement type on at least one carrier frequency of higher priority compared to that of the serving carrier frequency. In these measurements:

(a) the UE 120 is configured to perform the at least one of a measurement of the second measurement type and a measurement of the third measurement type during a required time such that first pre-defined requirements for the at least one of a measurement of the second measurement type and a measurement of the third measurement type are met, the required time forming part of a time available for measurements, and b the UE 120 is configured to perform the measurement of the first measurement type during a remaining time, during which the at least one of a measurement of the second measurement type and a measurement of the third measurement type is not performed, wherein the required time and the remaining time form different parts of the time available for measurements.

The UE 120 may be configured to perform the measurements by means of a measuring circuit 1310 in the UE 120 and in some embodiments by a prioritizing circuit 1320. The UE 120 may further comprise a sending circuit 1330, a receiving circuit 1340 and a processor 1350.

The UE 120 may be configured to perform the first measurement type on at least one CSG cell for cell reselection to that CSG cell.

The UE 120 may be configured to perform the method during a Discontinuous Reception, DRX, cycle: The DRX cycle comprises periods of receiver ON time and periods of receiver OFF time. The periods of receiver OFF time are interrupted by the periods of receiver ON time of the DRX cycle.

In some embodiments, the time available for measurements comprises periods of receiver OFF time of the DRX cycle, and the required time comprises parts of at least a subset of the periods of receiver OFF time of the DRX cycle. In these embodiments, the remaining time comprises parts of the periods of receiver OFF time that are not comprised in the required time.

In an example, the at least one of a measurement of a second measurement type and a measurement of a third measurement type is a measurement of the second measurement type. In this example, the UE 120 is configured to perform the measurement of the third measurement type in addition to the measurement of the first measurement type during the remaining time of the time available for measurements. In this example, the UE 120 is configured to determine respective maximum times available for the measurements of the first and third measurement types by scaling of the remaining time, being an available time, T, for performing the measurements of the first and third measurement types, by scaling factors τ1 and τ3 respectively. In this example, the maximum times available for the measurements of the first and third measurement types are expressed as τ1*T and τ3*T respectively.

In this example, the UE 120 may be configured to perform the measurements of the first and third measurement types during the remaining time such that at least one of the first pre-defined requirements and the second pre-defined requirements are met for the measurements of the first and third measurement types depending upon the values of T, τ1 and τ3. The first pre-defined requirements may be more stringent than the second pre-defined requirements. The first pre-defined requirements are met:

(a). for the first measurement type when none of the measurement of the second and third measurement types are performed and (b). for the third measurement type when no measurement of the first measurement type is performed.

The values of the scaling factors τ1 and τ3 may be pre-defined or configured by the network node 111.

In some embodiments, the values of the scaling factors τ1 and τ3 depend upon one or more of the following:

(a). Whether a DRX cycle is used or not;
(b). a Length of the DRX cycle;
(c). the DRX cycle's duration of receiver ON time during which the UE 120 is configured to receive signals from the network node 111.
(d). the relation between the length of the DRX cycle and duration of receiver ON time of the DRX cycle.

The remaining time for performing the measurement of the first measurement type may depend upon one or more of the following:

(a). Whether a DRX cycle is used or not;
(b). a Length of the DRX cycle;
(c). the DRX cycle's duration of receiver ON time during which the UE 120 is configured to receive signals from the network node 111.
(d). the relation between the length of the DRX cycle and duration of receiver ON time of the DRX cycle.

The measurement of the first measurement type may be an autonomous search of a CSG cell when at least one CSG ID included in a CSG whitelist is provided to the UE 120 for cell reselection from a non-CSG cell to the CSG cell.

In some embodiments, the UE 120 is configured to perform the at least one of a measurement of the second measurement type and a measurement of the third measurement type on non-CSG cells.

The at least one of a measurement of the second measurement type and the measurement of the third measurement type may comprise a measurement of the third measurement type to be performed by searching a cell on a higher priority carrier frequency periodically.

The UE 120 may be configured to operate in a low activity Radio Resource Control, RRC, state, which low activity RRC state is any one of an idle mode, URA_PCH, CELL_PCH and CELL_FACH.

The first and/or second pre-defined requirements may specify any one or more of: a cell identification delay, physical layer measurement period, measurement accuracy, measurement reporting delay, applicable signal quality target for doing measurement and number of identified cells required to be measured by the UE 120.

To perform the method actions for configuring a User Equipment, UE, 120 to perform measurements of a plurality of measurement types, described above in relation to FIG. 9, the target network node 112 may comprise the following arrangement depicted in FIG. 14. As mentioned above the UE 120 is configured to be served by the network node 111 on a serving carrier frequency. The UE 120 may in some embodiments be served by the network node 111 on the serving carrier frequency in a cell when being in a CELL_FACH state. In further embodiments, the UE 120 may be configured with DRX.

The measurements of the plurality of measurement types comprise a measurement of a first measurement type and at least one of a measurement of a second measurement type and a measurement of a third measurement type. The measurement of the first measurement type is to be performed on at least one Closed Subscriber Group, CSG, cell, the measurement of the second measurement type is to be performed on at least one carrier frequency of low or equal priority compared to that of the serving carrier frequency, and the measurement of the third measurement type is to be performed on at least one carrier frequency of higher priority compared to that of the serving carrier frequency. The at least one of a measurement of the second measurement type and a measurement of the third measurement type is to be performed by the UE during a required time such that first pre-defined requirements for the at least one of a measurement of the second measurement type and a measurement of the third measurement type are met. The required time forms part of a time available for measurements.

The network node 111 is configured to configure the UE 120 with a maximum time available for the measurement of the first measurement type. The maximum time available for the measurement of the first measurement type is determined by scaling of a remaining time during which the UE is configured not to perform the at least one of a measurement of the second measurement type and a measurement of the third measurement type. The required time and the remaining time form different parts of the time available for measurements.

In some embodiments, the at least one of a measurement of a second measurement type and a measurement of a third measurement type is a measurement of the second measurement type and a measurement of the third measurement type is performed in addition to the measurement of the first measurement type during the remaining time of the time available for measurements. In these embodiments, the network node 111 is further configured to configure the UE 120 with a maximum time available for the measurement of the third measurement type, and the respective maximum times available for the measurements of the first and third measurement types are determined by scaling of the remaining time, being an available time, T, for performing the measurements of the first and third measurement types, by scaling factors $\tau 1$ and $\tau 3$ respectively. The maximum times available for the measurements of the first and third measurement types are expressed as $\tau 1 *T$ and $\tau 3*T$ respectively. The configuration the UE 120 may be performed by a configuring circuit 1410.

In some of these embodiments, the first or second pre-defined requirements are to be met for the measurement of the first and third measurement types depending upon the values of T, $\tau 1$ and $\tau 3$. In some embodiments, the first pre-defined requirements are more stringent than the second pre-defined requirements and the first pre-defined requirements are to be met for the first measurement type when none of the measurements of the second and third measurement types are performed and for the third measurement type when no measurement of the first measurement type is performed.

The values of the scaling factors $\tau 1$ and $\tau 3$ may depend upon one or more of the following:
 (a). Whether a DRX cycle is used or not;
 (b). a Length of a DRX cycle;
 (c). the DRX cycle's duration of receiver ON time during which the UE 120 is configured to receive signals from the network node 111.
 (d). Depending upon the relation between the length of a DRX cycle and duration of receiver ON time of the DRX cycle.

The embodiments herein may be implemented through one or more processors, such as a processor 1350 in the UE 120 depicted in FIG. 13 and the processor 1420 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the in the network node 111 or the UE 120. One such carrier may be in the form of a CD ROM disc. It is however feasible with other data carriers such as a memory stick. The computer program code may furthermore be provided as pure program code on a server and downloaded to the network node 111 or the UE 120.

The network node 111 may further comprise a memory 1430 and the UE 120 may further comprise a memory 1360 comprising one or more respective memory units. The memory is arranged to be used to store obtained information, store pre-determined rules data, configurations, schedulings, and applications etc. to perform the methods herein when being executed in the network node 111 or the UE 120.

Those skilled in the art will also appreciate that the, receiving circuit 1340 sending circuit 1330, measuring circuit 1310 and configuring circuit 1410 described above may refer to a combination of analog and digital circuits, and/or one or more processors configured with software and/or firmware, e.g. stored in the memory, that when executed by the one or more processors such as the processors in the UE 120 and the network node 111 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

According to some embodiments, a method in a UE such as the UE 120 served by a network node such as the network node 111, of prioritizing between a plurality of measurements is provided.

The method may comprise the following actions, which actions may be taken in any suitable order:

Performing the first measurement type and at least one of the second measurement type and third measurement type, wherein the first measurement type may be performed on at least one CSG cell for cell reselection to that CSG cell, the second measurement type may be performed on at least one carrier frequency of low or equal priority compared to that of the serving carrier frequency, and the third measurement type may be performed on at least one carrier frequency of higher priority compared to that of the serving carrier frequency. This action may be performed by a measuring circuit 1210 in the UE.

Prioritizing the second measurement type over the first and third measurement types, or the second and third measurement types over the first measurement type, wherein the prioritization may comprise:
 meeting the first pre-defined requirements for the second measurement type, wherein first pre-defined requirements are also met when none of the first or second measurement types are performed, or meeting the first pre-defined requirements for the second and third measurement types, wherein first pre-defined requirements are also met when none of the first or second measurement types are performed, and
 performing the first and third measurement types by sharing the available time, T, which is the remaining time after performing the second measurement type or performing the first measurement types by using the remaining time after performing the second and third measurement types.

This action 1102 may be performed by a prioritizing circuit in the UE.

The prioritizing action may also be referred to as:
Prioritizing the second measurement type over the first and third measurement types, wherein the prioritization may comprise:
 meeting the first pre-defined requirements for the second measurement type, wherein first pre-defined requirements are also met when none of the first or second measurement types are performed, and.
 performing the first and third measurement types by sharing the available time, T, which is the remaining time after performing the second measurement type.

Or as an alternative:

Prioritizing the second and third measurement types over the first measurement type, wherein the prioritization may comprise:

meeting the first pre-defined requirements for the second and third measurement types, wherein first pre-defined requirements are also met when none of the first or second measurement types are performed, and performing the first measurement types by using the remaining time after performing the second and third measurement types Note that the term pre-defined may also be referred to as defined. The actions 1102a and 1102b may be performed by a prioritizing circuit in the UE.

In some embodiments, a scaling of the available time, T, for performing first and third measurement types is determined by scaling factors τ1 and τ3 respectively, and the maximum time available for the first and third measurement types are expressed as τ1*T and τ3*T respectively.

In some embodiments, the first or second pre-defined requirements are met for the first and third measurement types depending upon the values of T, τ1 and τ3, and the first pre-defined requirements are more stringent than the second one and the former are met when none of the other measurement types are performed.

In some embodiments, the scaling factors are equal such that τ1=τ3=0.5.

In some embodiments, the scaling factor τ1=0 when the second measurement type are performed or configured by the network node.

The values of scaling factors may be pre-defined or configured by the network node.

The values of the scaling factors may for example depend upon one or more of the following:

a. Whether a DRX cycle is used or not;

b. Length of a DRX cycle;

c. DRX cycle's ON duration during which the UE is configured to receive signals from the network node.

d. Depending upon the relation between the length of a DRX cycle and ON duration of the DRX cycle.

The first measurement type may be autonomous search of a CSG cell when at least one CSG ID is included in a CSG whitelist provided to the UE and the cell reselection is performed from a non-CSG cell to the CSG cell. A CSG white list is a list of IDs of CSGs permissible for the UE to select.

The second and third measurement types may be performed on non-CSG cells.

The third measurement type may be performed by searching a cell on a higher priority carrier frequency periodically.

In some embodiments, the priority of carrier frequencies is configured by the network node such as the network node 111.

In some embodiments, the UE is configured to operate in a low activity RRC state.

The low activity RRC state may be any one of an idle mode, URA_PCH, CELL_PCH and CELL_FACH. Further, the wherein the UE may be configured to operate in a second DRX cycle.

In some embodiments, the first or second pre-defined requirements is any one or more of: a cell identification delay, physical layer measurement period, measurement accuracy, measurement reporting delay, applicable signal quality target for doing measurement and number of identified cells required to be measured by the UE.

Non serving carrier frequencies may be inter-frequency carriers and/or inter-RAT carriers. The inter-RAT carrier may be any one out of: E-UTRA FDD carrier, E-UTRA TDD carrier, GSM carrier, CDMA2000 carrier or High Rate Packet Data (HRPD) carrier.

The network node such as e.g. the network node 111 may be any one of a base station, an RNC, a Node B, a relay and an access point.

The UE, such as the UE 120 may comprise an interface unit to facilitate communications between the UE 120 and other nodes or devices, e.g., the network node 111. The interface may, for example, include a transceiver configured to transmit and receive radio signals over an air interface in accordance with a suitable standard.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

ABBREVIATIONS

3GPP 3rd Generation Partnership Project
CSG Closed Subscriber Group
DRX Discontinuous Reception
HSPA High Speed Packet Access
L1/L3 Layer 1/Layer 3
RAT Radio Access Technology
RNC Radio Network Controller
RRC Radio Resource Control
RX Receiver
UE User Equipment
UMTS Universal Mobile Telecommunications System
BS Base Station
BW Bandwidth
CID Cell Identity
CRS Cell-specific Reference Signal
DL Downlink
ESS Enhanced Synchronization Signal
ID Identity
LTE Long Term Evolution
MDT Minimization of drive test
OFDM Orthogonal Frequency Division Multiplexing
PBCH Physical Broadcast Channel Indicator
PCFICH Physical Control format Indicator
PDCCH Physical Downlink Control Channel
PDSCH Physical Downlink Shared Channel
PHICH Physical Hybrid ARQ Indicator Channel
PSS Primary Synchronization Signal
RAT Radio Access Technology
RE Resource Element
RB Resource Block
RRM Radio Resource Management
RSRQ Reference signal received quality
RSRP Reference signal received power
SFN Single Frequency Network
SSS Secondary Synchronization Signal
UE User Equipment
UL Uplink
SON Self Organizing Network
RSSI Received signal strength indicator
OTDOA Observed time difference of arrival

The invention claimed is:

1. A method performed by a wireless device configured to be served by a serving carrier and configured to make measurements of carriers, the method comprising:

performing, during a first time period, at least one of a first measurement of a first carrier having lower priority than a priority of the serving carrier and a second measurement of a second carrier having a higher priority than the priority of the serving carrier, the first time period being a subset of an available time for performing measurements; and performing a third measurement of a closed subscriber group (CSG) cell during a second time period remaining in the available time, the second time period being exclusive of the first time period.

2. The method of claim 1, wherein the available time for performing measurements includes periods of time during which a receiver of the wireless device is OFF during a discontinuous reception (DRX) cycle.

3. The method of claim 2, wherein the DRX cycle includes receiver ON time interposed between periods of the receiver OFF time.

4. The method of claim 1, wherein the first measurement is performed during the first time period and the second measurement is performed during a portion of the second time period during which the third measurement is not being performed.

5. The method of claim 4, wherein the times available for performing the second and third measurements are derived from scaling the second time period by respective scaling factors.

6. The method of claim 5, wherein the respective scaling factors depend on at least one of:
   whether a discontinuous reception (DRX) cycle is used;
   a length of the DRX cycle, a relation between the length of the DRX cycle; and
   a duration of receiver ON time.

7. The method of claim 1, wherein a duration of the second time period depends on at least one of:
   whether a discontinuous reception (DRX) cycle is used;
   a length of the DRX cycle, a relation between the length of the DRX cycle; and
   a duration of receiver ON time.

8. The method of claim 1, wherein the third measurement is an autonomous search of a CSG cell when at least one CSG identity included in a CSG whitelist is provided to the wireless device for cell reselection from a non-CSG cell to the CSG cell.

9. The method of claim 1, wherein at least one of the first and second measurements is performed on non-CSG cells.

10. The method of claim 1, wherein the at least one of the first and second measurements are performed during a required time during the first time period such that pre-defined requirements for the at least one of the first and second measurements are met.

11. A wireless device configured to be served by a serving carrier and configured to make measurements of carriers, the wireless device configured to:
   perform, during a first time period, at least one of a first measurement of a first carrier having lower priority than a priority of the serving carrier and a second measurement of a second carrier having a higher priority than the priority of the serving carrier, the first time period being a subset of an available time for performing measurements; and
   perform a third measurement of a closed subscriber group (CSG) cell during a second time period remaining in the available time, the second time period being exclusive of the first time period.

12. The wireless device of claim 11, wherein the available time for performing measurements includes periods of time during which a receiver of the wireless device is OFF during a discontinuous reception (DRX) cycle.

13. The wireless device of claim 12, wherein the DRX cycle includes receiver ON time interposed between periods of the receiver OFF time.

14. The wireless device of claim 11, wherein the first measurement is performed during the first time period and the second measurement is performed during a portion of the second time period during which the third measurement is not being performed.

15. The wireless device of claim 14, wherein the times available for performing the second and third measurements are derived from scaling the second time period by respective scaling factors.

16. The wireless device of claim 15, wherein the respective scaling factors depend on at least one of:
   whether a discontinuous reception (DRX) cycle is used;
   a length of the DRX cycle, a relation between the length of the DRX cycle; and
   a duration of receiver ON time.

17. The wireless device of claim 11, wherein a duration of the second time period depends on at least one of:
   whether a discontinuous reception (DRX) cycle is used;
   a length of the DRX cycle, a relation between the length of the DRX cycle; and
   a duration of receiver ON time.

18. The wireless device of claim 11, wherein the third measurement is an autonomous search of a CSG cell when at least one CSG identity included in a CSG whitelist is provided to the wireless device for cell reselection from a non-CSG cell to the CSG cell.

19. The wireless device of claim 11, wherein at least one of the first and second measurements is performed on non-CSG cells.

20. The wireless device of claim 11, wherein the at least one of the first and second measurements are performed during a required time during the first time period such that pre-defined requirements for the at least one of the first and second measurements are met.

21. A method performed by a network node for configuring a wireless device served by a serving carrier to perform measurements of carriers, the measurements including, during a first time period, at least one of a first measurement of a first carrier having lower priority than a priority of the serving carrier and a second measurement of a second carrier having a higher priority than the priority of the serving carrier, the first time period being a subset of an available time for performing measurements, the measurements further including a third measurement of a closed subscriber group (CSG) cell during a second time period remaining in the available time, the second time period being exclusive of the first time period, the method comprising:
   generating a maximum second time period for performing at least the third measurement at the wireless device by scaling the second time period; and
   transmitting the maximum second time period to the wireless device.

22. The method of claim 21, wherein the first measurement is performed during the second time period along with the third measurement and the maximum second time period has respective first and second maximum times for performing the first measurement and the third measurement, the first and second maximum times being achieved by scaling the maximum second time period by respective scaling factors, the first and second maximum times being mutually exclusive.

23. The method of claim 22, wherein at least one of first and second pre-defined requirements are applied to the first and third measurements depending on the scaling factors, the first pre-defined requirements being more stringent than the second pre-defined requirements.

24. The method of claim 23, wherein the first pre-defined requirements are applied during a time period when none of the first and second measurements are performed and during a time period when the second measurement is performed and the third measurement is not performed.

25. The method of claim 22, wherein the scaling factors depend on at least one of:
whether a discontinuous reception (DRX) cycle is used;
a length of the DRX cycle, a relation between the length of the DRX cycle; and
a duration of receiver ON time.

26. A network node for configuring a wireless device served by a serving carrier to perform measurements of carriers, the measurements including, during a first time period, at least one of a first measurement of a first carrier having lower priority than a priority of the serving carrier and a second measurement of a second carrier having a higher priority than the priority of the serving carrier, the first time period being a subset of an available time for performing measurements, the measurements further including a third measurement of a closed subscriber group (CSG) cell during a second time period remaining in the available time, the second time period being exclusive of the first time period, the network node configured to:
generate a maximum second time period for performing at least the third measurement at the wireless device by scaling the second time period; and
transmit the maximum second time period to the wireless device.

27. The network node of claim 26, wherein the first measurement is performed during the second time period along with the third measurement and the maximum second time period has respective first and second maximum times for performing the first measurement and the third measurement, the first and second maximum times being achieved by scaling the maximum second time period by respective scaling factors, the first and second maximum times being mutually exclusive.

28. The network node of claim 27, wherein at least one of first and second pre-defined requirements are applied to the first and third measurements depending on the scaling factors, the first pre-defined requirements being more stringent than the second pre-defined requirements.

29. The network node of claim 28, wherein the first pre-defined requirements are applied during a time period when none of the first and second measurements are performed and during a time period when the second measurement is performed and the third measurement is not performed.

30. The network node of claim 27, wherein the scaling factors depend on at least one of:
whether a discontinuous reception (DRX) cycle is used;
a length of the DRX cycle, a relation between the length of the DRX cycle; and
a duration of receiver ON time.

* * * * *

UNITED STATES PATENT AND TRADEMARK OFFICE
CERTIFICATE OF CORRECTION

PATENT NO. : 9,756,566 B2  
APPLICATION NO. : 15/204572  
DATED : September 5, 2017  
INVENTOR(S) : Chapman et al.

Page 1 of 3

It is certified that error appears in the above-identified patent and that said Letters Patent is hereby corrected as shown below:

In the Drawings

Figure 3:
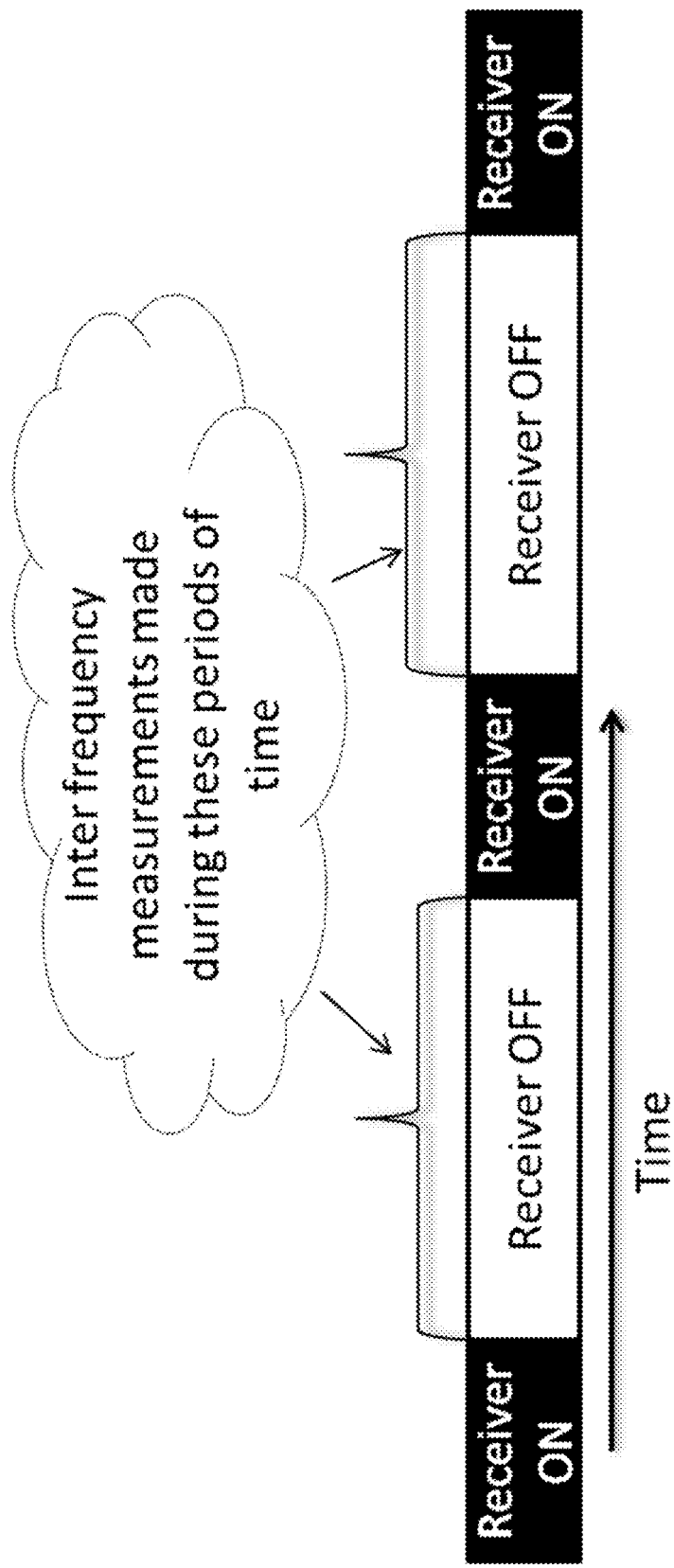
FIG. 3 is a schematic block diagram illustrating allocation of time for gathering L1 and L3 filter samples for inter-frequency measurements according to prior art.
Figure 4:
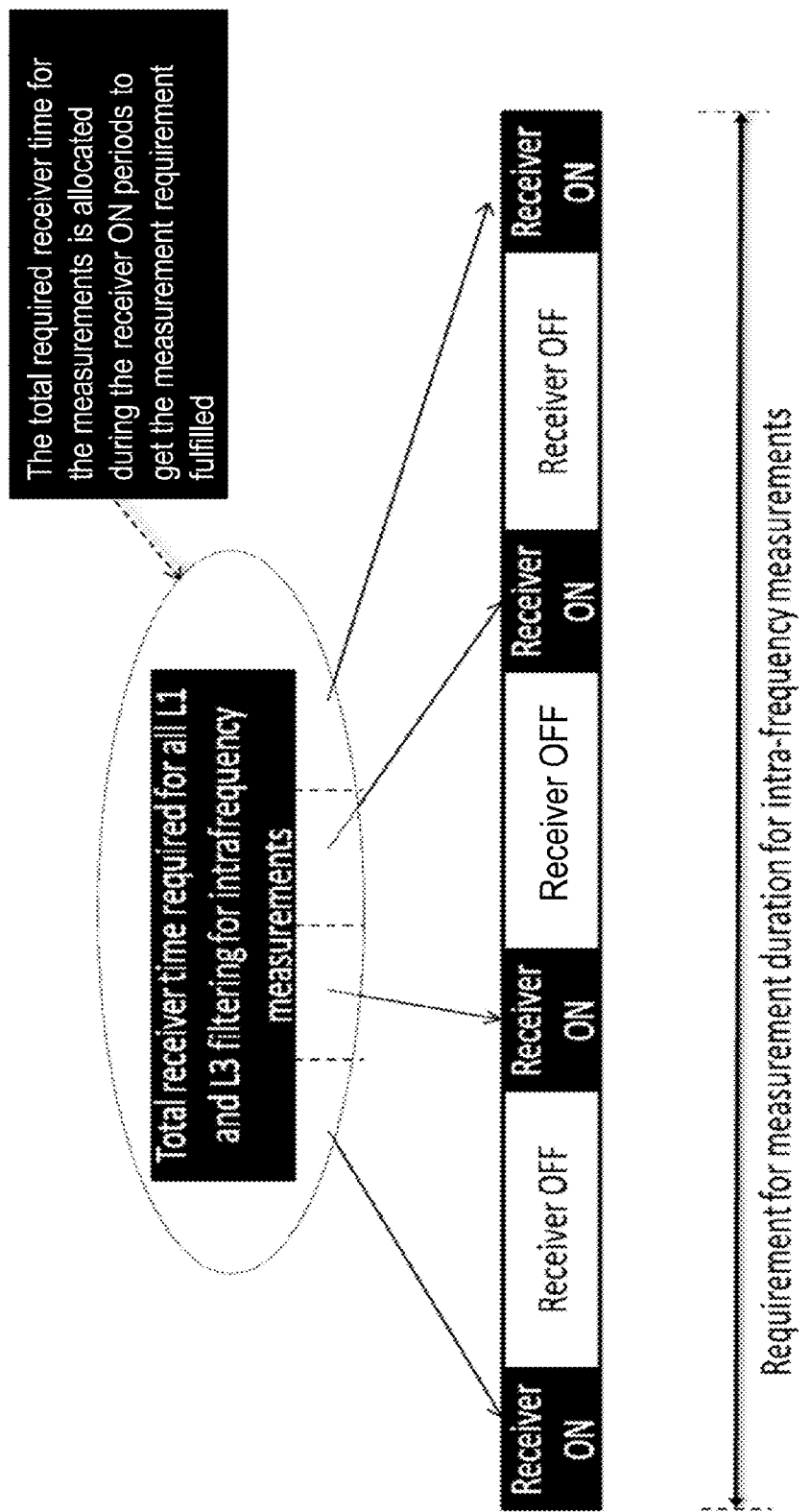
FIG. 4 is a schematic block diagram illustrating derivation of the requirement for intra-frequency measurements in CELL_FACH according to prior art.

In Fig. 3, Sheet 3 of 14, delete "Fig. 3." and insert -- Fig. 3 --, therefor.

Figure 5:
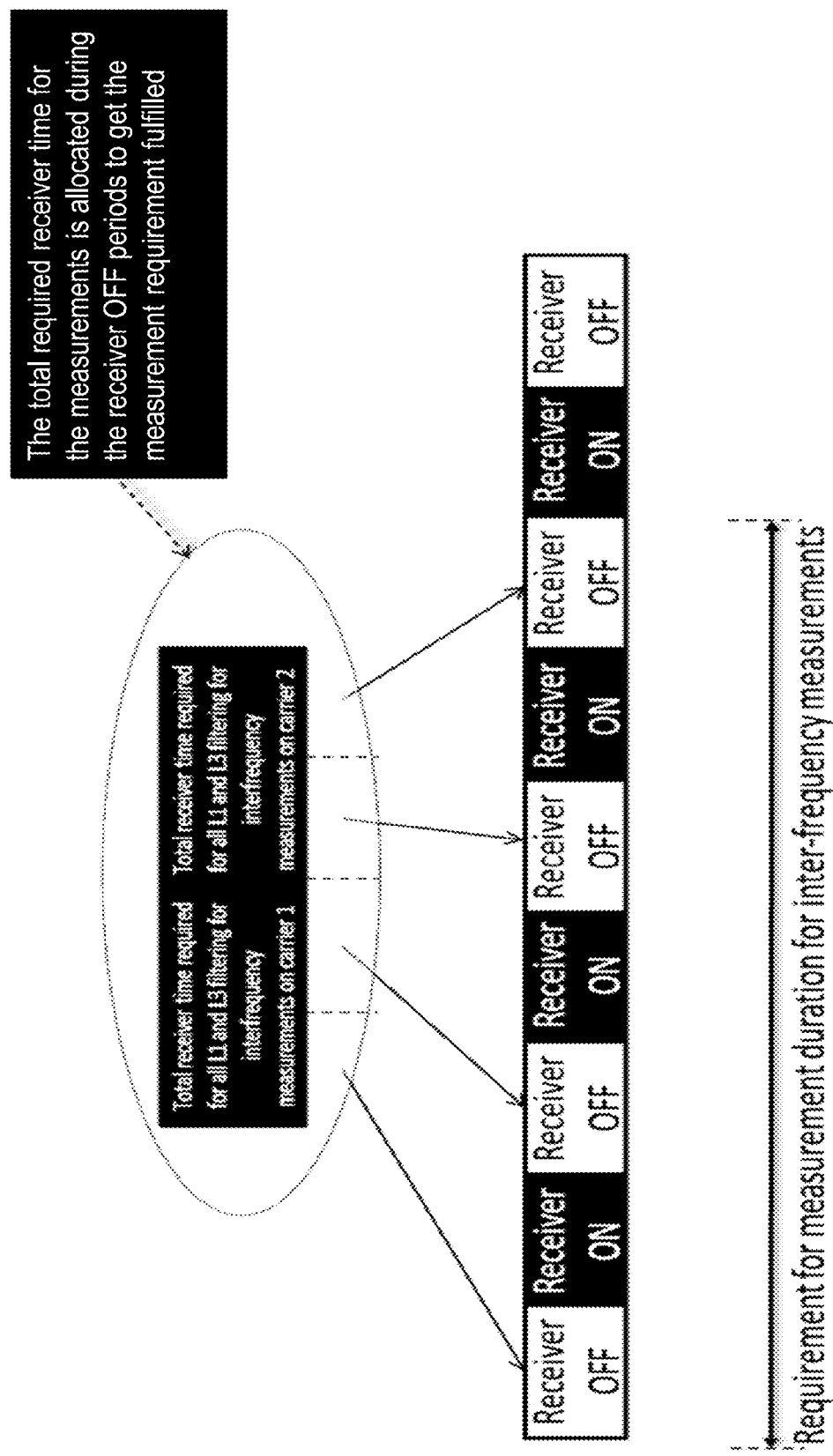
FIG. 5 is a schematic block diagram illustrating derivation of the requirement for inter-frequency measurements in CELL_FACH according to prior art.

In Fig. 5, Sheet 5 of 14, delete "Fig. 5." and insert -- Fig. 5 --, therefor.

Figure 6:
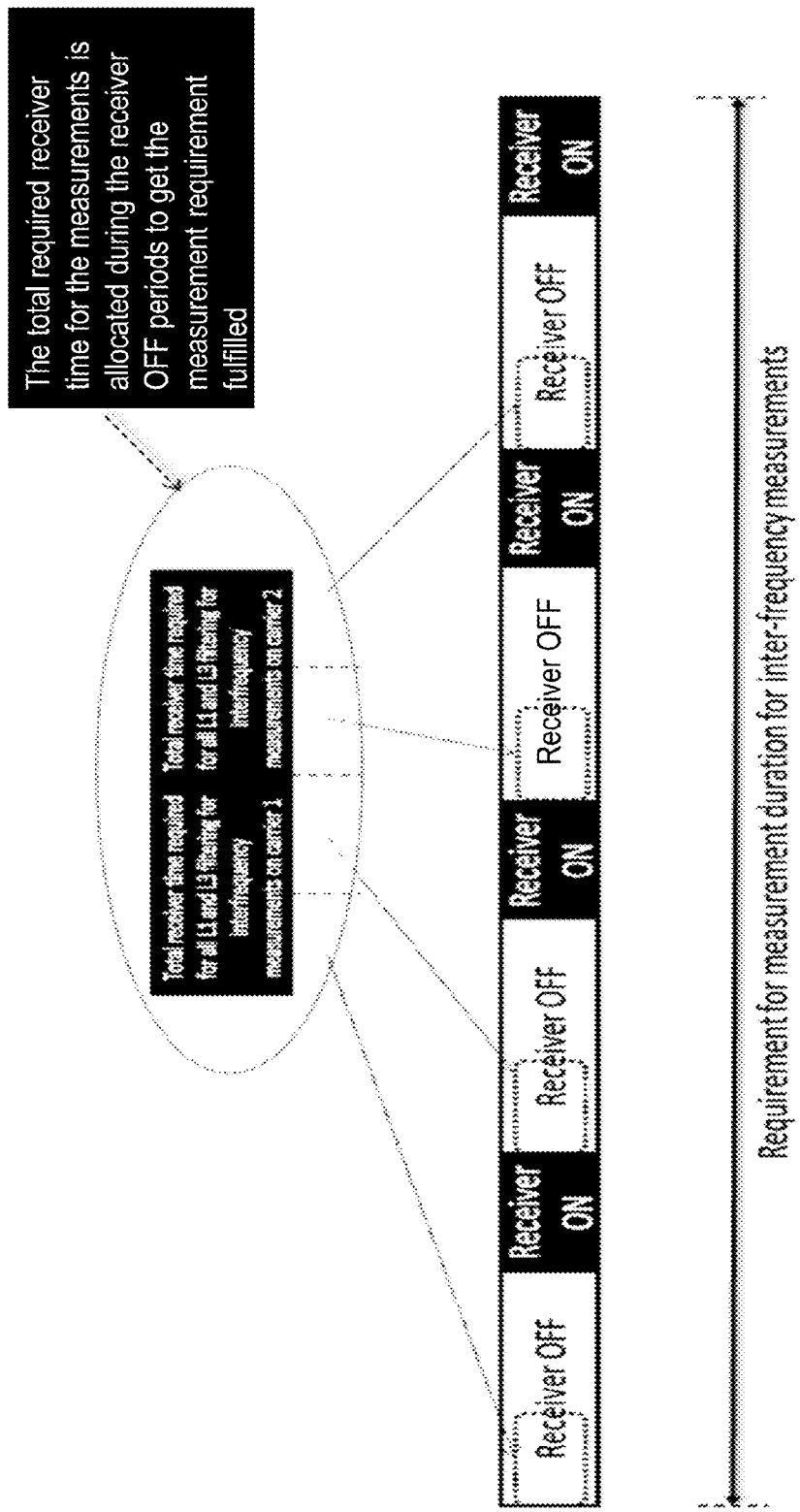
FIG. 6 is a schematic block diagram illustrating derivation of the requirement for inter-frequency measurements in CELL_FACH according to prior art.

In Fig. 6, Sheet 6 of 14, delete "Fig. 6." and insert -- Fig. 6 --, therefor.

In the Specification

In Column 1, Line 8, delete "2014," and insert -- 2014, now Pat. No. 9,420,486, --, therefor.

In Column 2, Line 61, delete "Pilot Channel" and insert -- Pilot Indicator Channel --, therefor.

In Column 3, Line 4, delete "(SIBs," and insert -- (SIBs), --, therefor.

In Column 3, Line 32, delete "it's receiver" and insert -- its receiver --, therefor.

In Column 3, Line 35, delete "it's receiver" and insert -- its receiver --, therefor.

In Column 3, Line 65, delete "it's camped" and insert -- its camped --, therefor.

In Column 3, Line 65, delete "re-tune it's" and insert -- re-tune its --, therefor.

In Column 4, Line 2, delete "it's receiver" and insert -- its receiver --, therefor.

In Column 4, Line 13, delete "it's inter-" and insert -- its inter- --, therefor.

In Column 4, Line 14, delete "it's decision" and insert -- its decision --, therefor.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)

In Column 9, Line 43, delete "FIGURES" and insert -- BRIEF DESCRIPTION OF FIGURES --, therefor.

In Column 11, Line 16, delete "CELL FACH" and insert -- CELL_FACH --, therefor.

In Column 12, Line 60, delete "carriers" and insert -- carriers. --, therefor.

In Column 13, Line 57, delete "a The" and insert -- (a) The --, therefor.

In Column 13, Line 66, delete "i. e." and insert -- i.e. --, therefor.

In Column 14, Line 37, delete "b The" and insert -- (b) The --, therefor.

In Column 16, Line 39, delete "111." and insert -- 111; --, therefor.

In Column 16, Line 50, delete "111." and insert -- 111; --, therefor.

In Column 17, Line 20, delete "and." and insert -- and --, therefor.

In Column 17, Line 34, delete "types" and insert -- types. --, therefor.

In Column 18, Line 46, delete "111." and insert -- 111; --, therefor.

In Column 21, Line 39, delete "120." and insert -- UE 120. --, therefor.

In Column 23, Line 39, delete "it's maximum" and insert -- its maximum --, therefor.

In Column 24, Line 66, delete "b the" and insert -- (b) the --, therefor.

In Column 25, Line 65, delete "111." and insert -- 111; --, therefor.

In Column 26, Line 8, delete "111." and insert -- 111; --, therefor.

In Column 27, Line 44, delete "111." and insert -- 111; --, therefor.

In Column 28, Line 64, delete "and." and insert -- and --, therefor.

In Column 29, Line 11, delete "types" and insert -- types. --, therefor.

In Column 29, Line 38, delete "node." and insert -- node; --, therefor.

In Column 30, Line 44, delete "PCFICH Physical Control format Indicator" and insert -- PCFICH Physical Control format Indicator Channel --, therefor.

In Column 30, Line 49, delete "RAT Radio Access Technology".

In Column 30, Line 57, delete "UE User Equipment".